(12) United States Patent
Matsukawa et al.

(10) Patent No.: US 6,574,125 B2
(45) Date of Patent: Jun. 3, 2003

(54) DC-DC CONVERTER AND BI-DIRECTIONAL DC-DC CONVERTER AND METHOD OF CONTROLLING THE SAME

(75) Inventors: Mitsuru Matsukawa, Kyoto (JP); Nobuhiro Kurio, Kyoto (JP); Hitoshi Nakagaki, Kyoto (JP); Takaya Hasebe, Kyoto (JP)

(73) Assignee: Nissin Electric Co., Ltd., Kyoto (JP)

( * ) Notice: Subject to any disclaimer, the term of this patent is extended or adjusted under 35 U.S.C. 154(b) by 0 days.

(21) Appl. No.: 10/052,414

(22) Filed: Jan. 23, 2002

(65) Prior Publication Data

US 2002/0126517 A1 Sep. 12, 2002

(30) Foreign Application Priority Data

| Jan. 24, 2001 | (JP) | ................................. | 2001-016019 |
| Oct. 1, 2001 | (JP) | ................................. | 2001-305490 |
| Oct. 1, 2001 | (JP) | ................................. | 2001-305491 |

(51) Int. Cl.⁷ .............................................. H02M 7/00
(52) U.S. Cl. ............................ 363/71; 363/17; 363/98; 363/132; 363/70
(58) Field of Search ............................... 363/17, 65, 71, 363/98, 132, 70

(56) References Cited

U.S. PATENT DOCUMENTS

| 4,695,933 A | | 9/1987 | Nguyen et al. | |
| 5,576,940 A | * | 11/1996 | Steigerwald et al. | .......... 363/17 |
| 6,388,904 B2 | * | 5/2002 | Nomura | ....................... 363/71 |

* cited by examiner

*Primary Examiner*—Michael Sherry
*Assistant Examiner*—Gary L. Laxton
(74) *Attorney, Agent, or Firm*—Finnegan, Henderson, Farabow, Garrett & Dunner LLP

(57) ABSTRACT

A DC—DC converter has converter circuit portions 11 and 12, transformers $Tr_1$ and $Tr_2$, and rectifier circuit portions 21 and 22. Two sets of converter circuit portions 11 and 12 respectively include two pairs of switching elements $Q_1$ to $Q_4$, and two pairs of switching elements $Q_5$ to $Q_8$ connected in full bridge configuration, series capacitors $C_1$ and $C_2$ are inserted and connected between the converter circuit portions 11 and 12 and the transformers $Tr_1$ and $Tr_2$ respectively. The switching phase of one switching element $Q_4$ or $Q_8$ is shifted by a 1/3n period from the switching phase of the other switching element $Q_1$ or $Q_5$ in the pair of switching elements. The switching phases of corresponding switching elements $Q_1$ and $Q_5$ in the converter circuit portions 11 and 12 are shifted by a 1/2n period from each other.

19 Claims, 21 Drawing Sheets

FIG.4

|  | ONE PERIOD [T] | | | | | | | |
|---|---|---|---|---|---|---|---|---|
|  | 1/4 PERIOD T1 [1/4·T] | | 1/4 PERIOD T2 [1/4·T] | | 1/4 PERIOD T3 [1/4·T] | | 1/4 PERIOD T4 [1/4·T] | |
|  | t1 | t2 | t3 | t4 | t5 | t6 | t7 | t8 |
| Q1, Q4 | 0→1 | 1→1 | 1→0 | 0→0 | 0→0 | 0→0 | 0→0 | 0→0 |
| Q2, Q3 | 0→0 | 0→0 | 0→0 | 0→0 | 0→1 | 1→1 | 1→0 | 0→0 |
| Q5, Q8 | 0→0 | 0→0 | 0→1 | 1→1 | 1→0 | 0→0 | 0→0 | 0→0 |
| Q6, Q7 | 1→0 | 0→0 | 0→0 | 0→0 | 0→0 | 0→0 | 0→1 | 1→1 |

NOTE:
0→1 INDICATES THAT CURRENT CHANGES FROM ZERO TO 1 p.u.
1→1 INDICATES THAT CURRENT IS KEPT AT 1 p.u.
1→0 INDICATES THAT CURRENT CHANGES FROM 1 p.u. TO ZERO

FIG.10

|  | ONE PERIOD [T] | | | | | | | |
|---|---|---|---|---|---|---|---|---|
|  | 1/4 PERIOD T1 [1/4·T] | | 1/4 PERIOD T2 [1/4·T] | | 1/4 PERIOD T3 [1/4·T] | | 1/4 PERIOD T4 [1/4·T] | |
|  | t1 | t2 | t3 | t4 | t5 | t6 | t7 | t8 |
| Q1, Q4 | 0→1 | 1→1 | 1→0 | 0→0 | 0→0 | 0→0 | 0→0 | 0→0 |
| Q2, Q3 | 0→0 | 0→0 | 0→0 | 0→0 | 0→1 | 1→1 | 1→0 | 0→0 |
| Q5, Q8 | 0→0 | 0→0 | 0→1 | 1→1 | 1→0 | 0→0 | 0→0 | 0→0 |
| Q6, Q7 | 1→0 | 0→0 | 0→0 | 0→0 | 0→0 | 0→0 | 0→1 | 1→1 |

NOTE:
0→1 INDICATES THAT CURRENT CHANGES FROM ZERO TO 1 p.u.
1→1 INDICATES THAT CURRENT IS KEPT AT 1 p.u.
1→0 INDICATES THAT CURRENT CHANGES FROM 1 p.u. TO ZERO

FIG.14
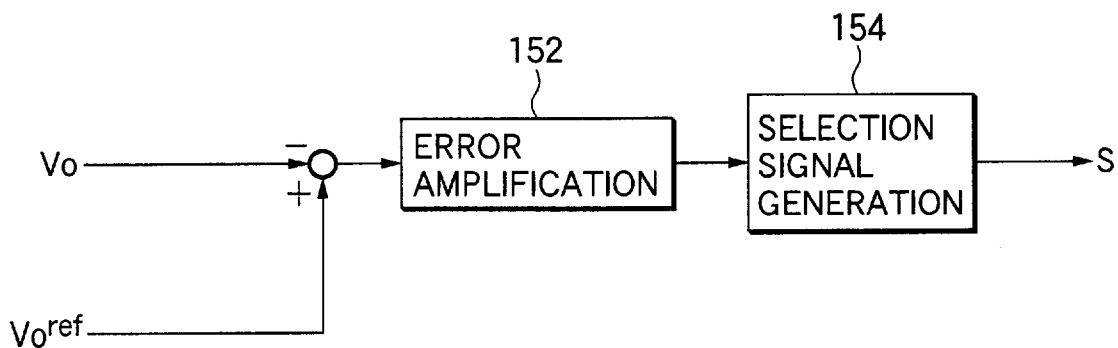
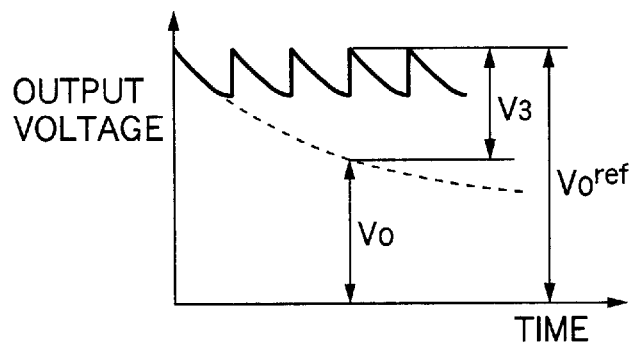
FIG.15A
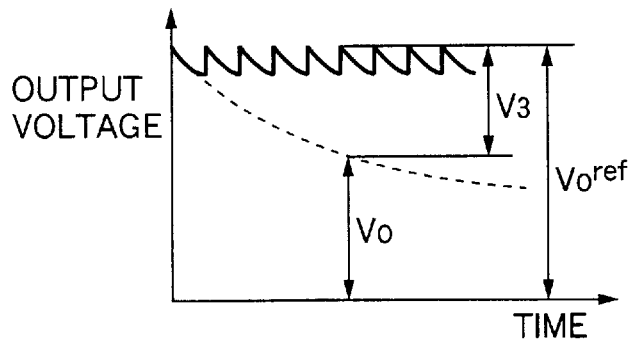
FIG.15B
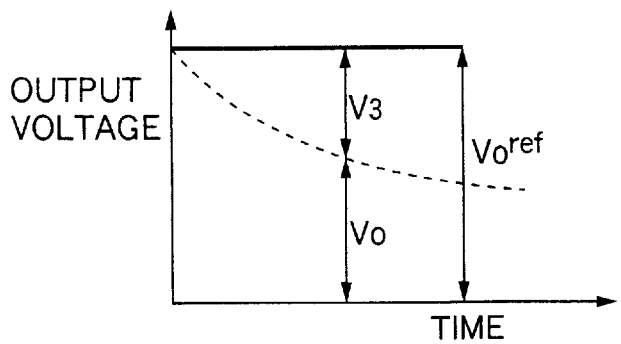
FIG.15C

FIG.20

| | ONE PERIOD [T] | | | | | | | |
|---|---|---|---|---|---|---|---|---|
| | 1/4 PERIOD T1 [1/4·T] | | 1/4 PERIOD T2 [1/4·T] | | 1/4 PERIOD T3 [1/4·T] | | 1/4 PERIOD T4 [1/4·T] | |
| | t1 | t2 | t3 | t4 | t5 | t6 | t7 | t8 |
| Q11, Q14 (Q21, Q24) | 0→1 | 1→1 | 1→0 | 0→0 | 0→0 | 0→0 | 0→0 | 0→0 |
| Q12, Q13 (Q22, Q23) | 0→0 | 0→0 | 0→0 | 0→0 | 0→1 | 1→1 | 1→0 | 0→0 |
| Q15, Q18 (Q25, Q28) | 0→0 | 0→0 | 0→1 | 1→1 | 1→0 | 0→0 | 0→0 | 0→0 |
| Q16, Q17 (Q26, Q27) | 1→0 | 0→0 | 0→0 | 0→0 | 0→0 | 0→0 | 0→1 | 1→1 |

NOTE :

0→1 INDICATES THAT CURRENT CHANGES FROM ZERO TO 1 p.u.

1→1 INDICATES THAT CURRENT IS KEPT AT 1 p.u.

1→0 INDICATES THAT CURRENT CHANGES FROM 1 p.u. TO ZERO

Prior Art FIG. 25
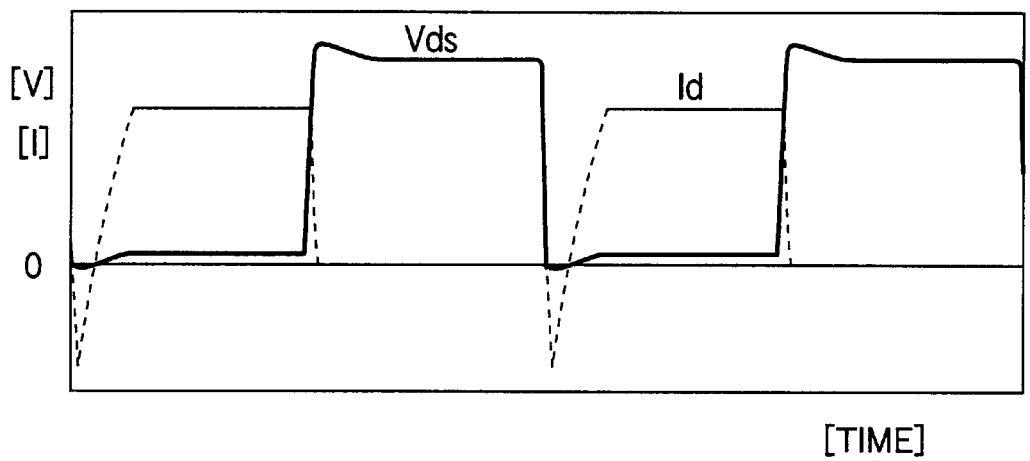
Prior Art FIG. 26A
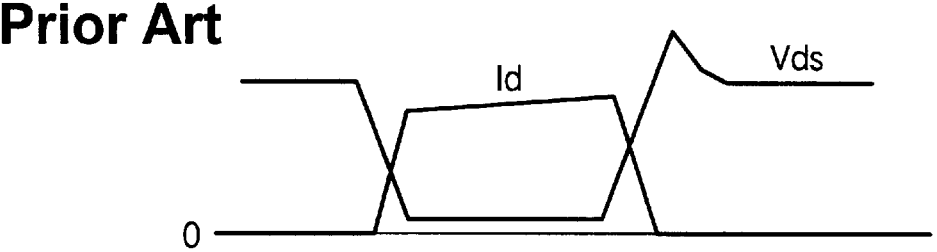
Prior Art FIG. 26B
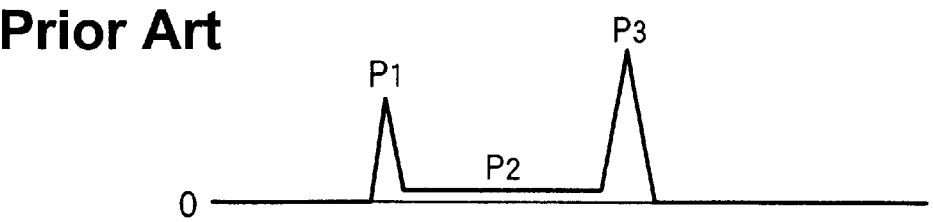

DC-DC CONVERTER AND BI-DIRECTIONAL DC-DC CONVERTER AND METHOD OF CONTROLLING THE SAME

BACKGROUND OF THE INVENTION

1. Field of the Invention

The present invention relates to a DC—DC converter and a bi-directional DC—DC converter, and a method of controlling the DC—DC converter or the bi-directional DC—DC converter. More particularly, the present invention relates to a DC—DC converter used in a DC power source circuit for converting a power source voltage of a DC power source into a different DC voltage.

2. Description of the Related Art

For example, FIG. 23 shows an example of a prior-art DC—DC converter used in a DC power source circuit. FIG. 24 is a timing chart showing gate signals G for turning on/off respective switching elements $Q_1$ to $Q_4$ in the DC—DC converter.

The DC—DC converter shown in FIG. 23 has a converter circuit portion 1, a transformer Tr, a rectifier circuit 2, and an LC smoothing circuit 3. The converter circuit portion 1 includes two pairs of switching elements $Q_1$, $Q_4$ and $Q_2$, $Q_3$ (MOS-FETs) formed into full bridge configuration and connected to a DC power source E. The transformer Tr is connected to an output side of the converter circuit portion 1. The rectifier circuit 2 is connected to a secondary output side of the transformer Tr and includes two pairs of diodes $D_1$, $D_4$ and $D_2$, $D_3$. The LC smoothing circuit 3 is connected to an output side of the rectifier circuit 2.

In the DC—DC converter, in the converter circuit portion 1, the switching elements $Q_1$, $Q_4$ and $Q_2$, $Q_3$ are turned on/off alternately as shown in the timing chart of FIG. 24 to thereby obtain an AC waveform output. The AC waveform output of the converter circuit portion 1 is transformed by the transformer Tr. The secondary output of the transformer Tr is rectified by the rectifier circuit 2 and smoothed by the LC smoothing circuit 3 to thereby generate a desired DC voltage.

Incidentally, when the load side of the transformer in the DC—DC converter is viewed from the input side of the transformer, the load is generally regarded as an inductive load (lagging load). In this case, voltages of the respective switching elements $Q_1$ to $Q_4$, that is, drain-source voltages $V_{ds}$ and drain currents $I_d$ are shaped like the waveforms shown in FIG. 25. FIG. 26A typically shows the wave forms of drain-source voltages $V_{ds}$ and drain currents $I_d$ of the switching elements $Q_1$ to $Q_4$ shown in FIG. 25. FIG. 26B shows a turn-on switching loss $P_1$, a turn-off switching loss $P_3$ and a conduction loss $P_2$.

As shown in FIG. 26B, the loss in the switching elements $Q_1$ to $Q_4$ (MOS-FETs) is classified into the switching losses $P_1$ and $P_3$ and the conduction loss $P_2$. The switching losses $P_1$ and $P_3$ are further classified into the turn-on switching loss $P_1$ and the turn-off switching loss $P_3$. The turn-on switching loss $P_1$ is produced when each of the switching elements $Q_1$ to $Q_4$ is turned on. The turn-off switching loss $P_3$ is produced when each of the switching elements $Q_1$ to $Q_4$ is turned off. That is, the switching loss is produced when a drain-source voltage $V_{ds}$ is applied while a drain current $I_d$ flows in a short-time transient state in which each of the switching elements $Q_1$ to $Q_4$ is turned on/off. On the other hand, the conduction loss $P_2$ is an ohmic loss which is produced on the basis of ON-resistance and drain current when each of the switching elements $Q_1$ to $Q_4$ is turned on.

Incidentally, with respect to the switching loss in the case of an inductive load (lagging load), the turn-off switching loss $P_3$ is generally larger than the turn-on switching loss $P_1$. The turn-on switching loss $P_1$ may not be produced if circuit constants can be set suitably.

To increase the switching frequency is effective means for reduction in size of the DC—DC converter because reduction in size of the transformer Tr can be attained when the switching frequency is increased. As the switching frequency increases, however, the switching loss increases in proportion to the switching frequency. Hence, to increase the switching frequency is not suitable means for reduction of the switching loss.

When an MOS-FET is used as each of the switching elements $Q_1$ to $Q_4$, high-speed switching can be made because the MOS-FET can be turned on/off speedily compared with a bipolar transistor or an IGBT (Insulated Gate Bipolar Transistor). The MOS-FET, however, has the characteristic in which the ON-resistance of the MOS-FET increases in proportion to the $2.5^{th}$ power of element withstand voltage compared with the bipolar transistor or IGBT in which the ON-voltage little increases even though the withstand voltage is high. The conduction loss in the MOS-FET is an ohmic loss determined on the basis of ON-resistance and drain current. Therefore, use of a high withstand voltage MOS-FET brings exponential increase of the conduction loss. Accordingly, this causes reducing of efficiency of the DC—DC converter.

Further, in the converter circuit portion 1, the switching elements $Q_1$ to $Q_4$ are turned on/off so that a predetermined output voltage V is made to appear relative to an input voltage of the DC power source E. That is, because the pulse width of gate signals for turning on/off the switching elements $Q_1$ to $Q_4$ is constant, the ratio of output voltage to input voltage is kept constant. Hence, when the input voltage of the DC power source E fluctuates because of some cause, the output voltage V fluctuates. If such fluctuation in the output voltage V appears, stable electric power source to a load can be hardly performed.

Further, in the DC—DC converter, the converter circuit portion 1 provided on the left of the transformer Tr as shown in FIG. 23 is used as the primary side and the rectifier circuit 2 provided on the right of the transformer Tr as shown in FIG. 23 is used as the secondary side. Thus, electric power is supplied from the primary side to a load on the secondary side by electric discharge in the DC power source E. Hence, when the DC power source E includes a secondary battery such as a lead storage battery both dischargeable and chargeable, electric power conversion from the secondary side to the primary side exists for electrically charging the DC power source E as well as electric power conversion from the primary side to the secondary side. However, because the prior-art DC—DC converter can do nothing but electric power conversion from the primary side to the secondary side, the DC—DC converter was difficult to be applied to the purpose of electric power conversion from the secondary side to the primary side.

SUMMARY OF THE INVENTION

Therefore, a first object of the invention is to provide a DC—DC converter and a method of controlling the DC—DC converter in which reduction in switching loss is attained and in which low ON-resistance and low withstand voltage MOS-FETs can be used as switching elements.

A second object of the invention is to provide a DC—DC converter a method of controlling the DC—DC converter in which reduction in switching loss can be attained and in which a stable output voltage can be obtained.

A third object of the invention is to provide a bi-directional DC—DC converter a method of controlling the bi-directional DC—DC converter in which reduction in switching loss is attained and in which electric power conversion from the secondary side to the primary side can be performed as well as electric power conversion from the primary side to the secondary side.

In order to accomplish the objects above, the following means are adopted. According to the present invention, there is provided a DC—DC converter comprising: n sets of converter circuit portions for converting a power source voltage of a DC power supply into AC voltages, each of which includes two pairs of switching elements connected in full bridge configuration; and rectifier circuit portions provided on output sides of the converter circuit portions through transformers respectively. In the DC—DC converter, a switching phase of one switching element in each pair of switching elements included in each converter circuit portion is shifted by a 1/3n period from a switching phase of the other switching element in the pair of switching elements, and switching phases of corresponding switching elements in the converter circuit portions are shifted by a 1/2n period from one another. A control portion may be provided by performing the above-mentioned control for switching phases of switching elements.

According to the invention, in the n sets of converter circuit portions, the switching phase of one switching element in each pair of switching elements included in each of the converter circuit portions is shifted by a 1/3n period from the switching phase of the other switching element in the pair of switching elements. Further, the switching phases of corresponding switching elements in the n sets of converter circuit portions are shifted by a 1/2n period from one another. Hence, switching loss is never produced because the state in which a switching voltage is applied while a switching current flows in each switching element is eliminated by commutation.

In the DC—DC converter, series capacitors maybe inserted and connected between the converter circuit portions and the transformers respectively.

Series capacitors are inserted and connected between the converter circuit portions and the transformers respectively. Hence, a flat portion of the output voltage of each converter circuit portion is drooped (inclined) to form a voltage waveform having a high leading edge. Therefore, the difference between voltages before and after the commutation timing is made large so that a commutating operation can be performed steadily. Incidentally, the invention can be applied to switching elements such as bipolar transistors or IGBTs as well as the MOS-FETs.

Further, in the DC—DC converter, a voltage detecting unit may be provided on output sides of the rectifier circuit portions. A voltage compensating portion maybe also additionally provided so that an output voltage of the DC—DC converter is adjusted by a correcting instruction output from the control portion on the basis of a signal detected by the voltage detecting unit.

The voltage compensating portion includes a voltage compensating converter circuit portion and a voltage compensating rectifier circuit portion. The voltage compensating-converter circuit portion is parallel-connected to the converter circuit portions and has two pairs of switching elements connected in full bridge configuration. The voltage compensating rectifier circuit portion is series-connected to the rectifier circuit portions and provided on an output side of the voltage compensating converter circuit portion through a transformer. Alternatively, the voltage compensating portion has tap changing circuits which are provided between the transformers and the rectifier circuit portions respectively for changing taps in secondary windings of the transformers respectively. Incidentally, bipolar transistors or IGBTs as well as the MOS-FETs can be used as the switching elements.

The voltage detecting unit is provided on the output side of the rectifier circuit portions. The voltage compensating portion is additionally provided so that the output voltage of the DC—DC converter is adjusted by a correcting instruction output from the control portion on the basis of the signal detected by the voltage detecting unit. Hence, even in the case where the output voltage of the rectifier circuit portions fluctuates in accordance with fluctuation in the input voltage of the DC power source, the voltage compensating portion can compensate the voltage fluctuation. As a result, the output voltage can bead adjusted to a desired value, so that stabilization of the output voltage can be attained.

In the above-mentioned DC—DC converter, the n sets of converter circuit portions may be configured to be series or parallel-connected with respect to the DC power source. Preferably, each of the switching elements includes an MOS-FET, and the n sets of converter circuit portions are connected in series to the DC power source. With such a structure, the voltage applied to each MOS-FET in each converter circuit portion can be reduced to 1/n as much as the power source voltage of the DC power source. Hence, the withstand voltage of the MOS-FET used as a switching element can be reduced to 1/n, so that conduction loss, due to ON-resistance, increasing in proportion to the $2.5^{th}$ power of the withstand voltage can be prevented.

Further, in the above-mentioned DC—DC converter, preferably, one switching element in each pair of switching elements included in each converter circuit portion is replaced by a capacitor to thereby form the converter circuit portion into half bridge configuration. The switching phases of corresponding switching elements in the respective converter circuit portions are shifted by a 1/2n period from one another so that one switching element in each pair of switching elements included in each converter circuit portion is used as a trigger for commutation. Hence, a half bridge can be configured with only one switching element in each pair of switching elements included in each converter circuit portion.

Moreover, in the DC—DC converter, preferably, fault detecting units are provided in the converter circuit portions and in the rectifier circuit portions respectively. Further, an fault judging circuit may be additionally provided so that gate blocking signals for turning off the switching elements are output to the converter circuit portions on the basis of the signals detected by the fault detecting units.

In this manner, even in the case where fault such as overvoltage, overcurrent or overtemperature, occurs in the converter circuit portions or the rectifier circuit portions, the fault state can be detected by the fault detecting unit so that the converter circuit portions can be stopped on the basis of the gate blocking signals output from the fault judging circuit. Thus, the self-protecting function of the DC—DC converter can be fulfilled.

The above-mentioned objects can be also achieved by a bi-directional DC—DC converter comprising: n sets of first converter circuit portions connected in parallel to one another, each of which includes two pairs of anti-parallel diode-provided switching elements connected in full bridge configuration; and n sets of second converter circuit portions connected in parallel to one another, each of which includes two pairs of anti-parallel diode-provided switching elements connected in full bridge configuration, the first converter circuit portions being connected to the second converter circuit portions through transformers respectively. In the bi-directional DC—DC converter, in the n sets of first converter circuit portions or the n sets of second converter circuit portions located on an input side, inverter operations are performed in a timing in which a switching phase of one switching element in each pair of switching elements included in each of the n sets of converter circuit portions is shifted by a 1/3n period from a switching phase of the other switching element in the pair of switching elements, and switching phases of corresponding switching elements in the n sets of converter circuit portions are shifted by a 1/2n period from one another. Moreover, in the other n sets of converter circuit portions located on an output side, rectifying operations are performed by the anti-parallel diodes.

According to the invention, firstly, inn sets of converter circuit portions, the switching phase of one switching element in each pair of switching elements included in each of the converter circuit portions is shifted by a 1/3n period from the switching phase of the other switching element in the pair of switching elements. Further, the switching phases of corresponding switching elements in the converter circuit portions are shifted by a 1/2n period from one another. Hence, switching loss is never produced because the state in which a switching voltage is applied while a switching current flows in each switching element is eliminated by commutation. Incidentally, bipolar transistors or IGBTs as well as the MOS-FETs can be used as switching elements.

Secondly, the first and second converter circuit portions each including anti-parallel diode-provided switching elements connected in full bridge configuration are connected to one another through transformers respectively. The first converter circuit portions have the same circuit configuration as that of the second converter circuit portions so that each of the converter circuit portions includes anti-parallel diode-provided switching elements. Hence, inverter operations are performed in the first converter circuit portions or the second converter circuit portions located on an input side, while rectifying operations are performed by the anti-parallel diodes in the other converter circuit portions located on an output side. As a result, both electric power conversion from the first converter circuit portions to the second converter circuit portions and electric power conversion from the second converter circuit portions to the first converter circuit portions can be performed. Hence, bi-directional electric power conversion can be achieved.

Moreover, preferably, series capacitors are inserted and connected between the converter circuit portions and the transformers respectively. Accordingly, a flat portion of the output voltage of each converter circuit portion is drooped (inclined) to form a voltage waveform having a high leading edge. Hence, the difference between voltages before and after the commutation timing is made large so that the commutating operation can be performed steadily.

Further, preferably, fault detecting units are provided in the first and second converter circuit portions respectively. An fault judging circuit also may be provided so that gate blocking signals for turning off the switching elements respectively are selectively output to the first and second converter circuit portions on the basis of a signal detected by any one of the respective fault detecting units.

In this manner, even in the case where fault such as overvoltage, overcurrent or overtemperature, occurs in the first or second converter circuit portions, the fault state can be detected by the fault detecting units so that the first or second converter circuit portions can be stopped on the basis of gate blocking signals output from the fault judging circuit. Hence, the self-protecting function of the DC—DC converter can be fulfilled.

BRIEF DESCRIPTION OF THE DRAWINGS

FIG. 4 is a table showing the ON/OFF states of the respective switching elements in one period of the primary voltage waveforms of the transformers in FIG. 3;

FIG. 10 is a table showing the ON/OFF states of the respective switching elements in one period of the primary voltage waveforms of the transformers in FIG. 9;

FIG. 14 is a block diagram showing an example of control in a voltage compensating portion in the embodiment shown in FIG. 13;

FIGS. 15A to 15C are waveform charts for explaining the gist of voltage compensation in the embodiment shown in FIG. 13;

FIG. 20 is a table showing the ON/OFF states of the switching elements in one period of the primary voltage waveforms of the transformers in FIG. 19;

FIG. 25 is a waveform chart of the drain-source voltage and drain current of each switching element in FIG. 23;

FIG. 26A is a schematic chart showing waveforms of the drain-source voltage and drain current of the switching element depicted in FIG. 25; and FIG. 26B is a schematic chart showing turn-on switching loss, turn-off switching loss and conduction loss.

DETAILED DESCRIPTION OF THE INVENTION

Figure 1:
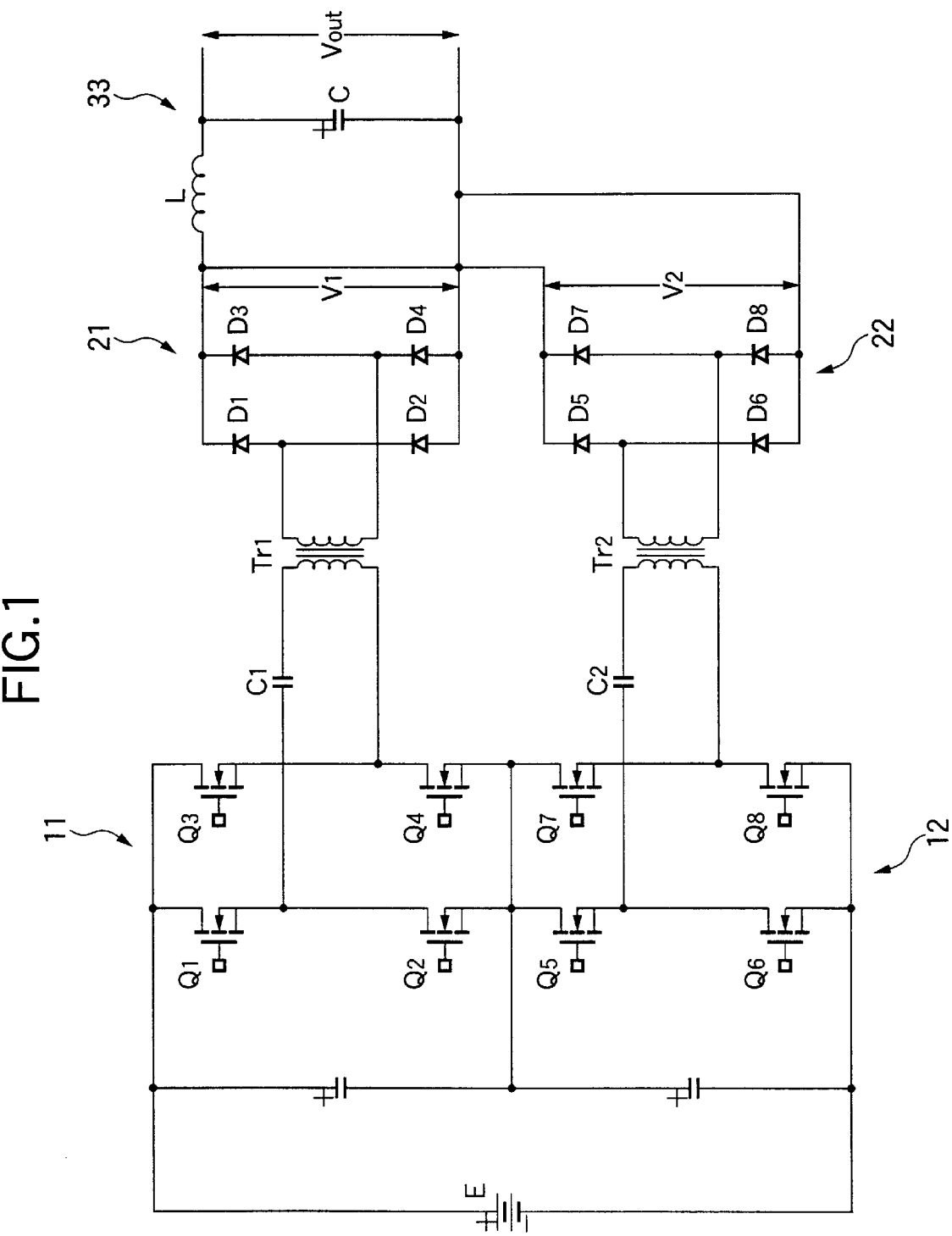
FIG. 1 is a circuit diagram of a DC—DC converter according to a first embodiment of the invention.
Figure 2:
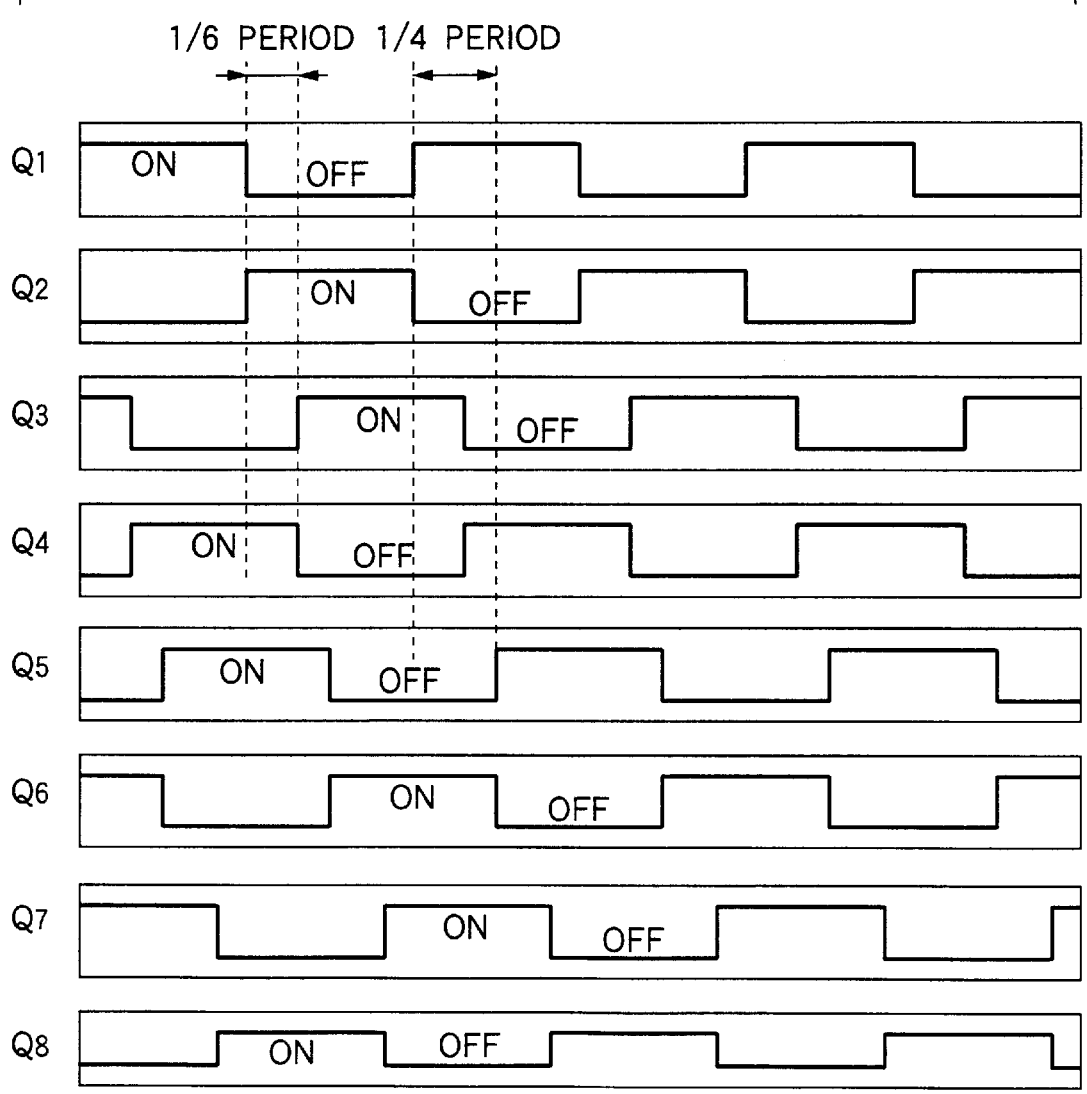
FIG. 2 is a timing chart of gate signals for turning on/off respective switching elements in the DC—DC converter depicted in FIG. 1.
Figure 3:
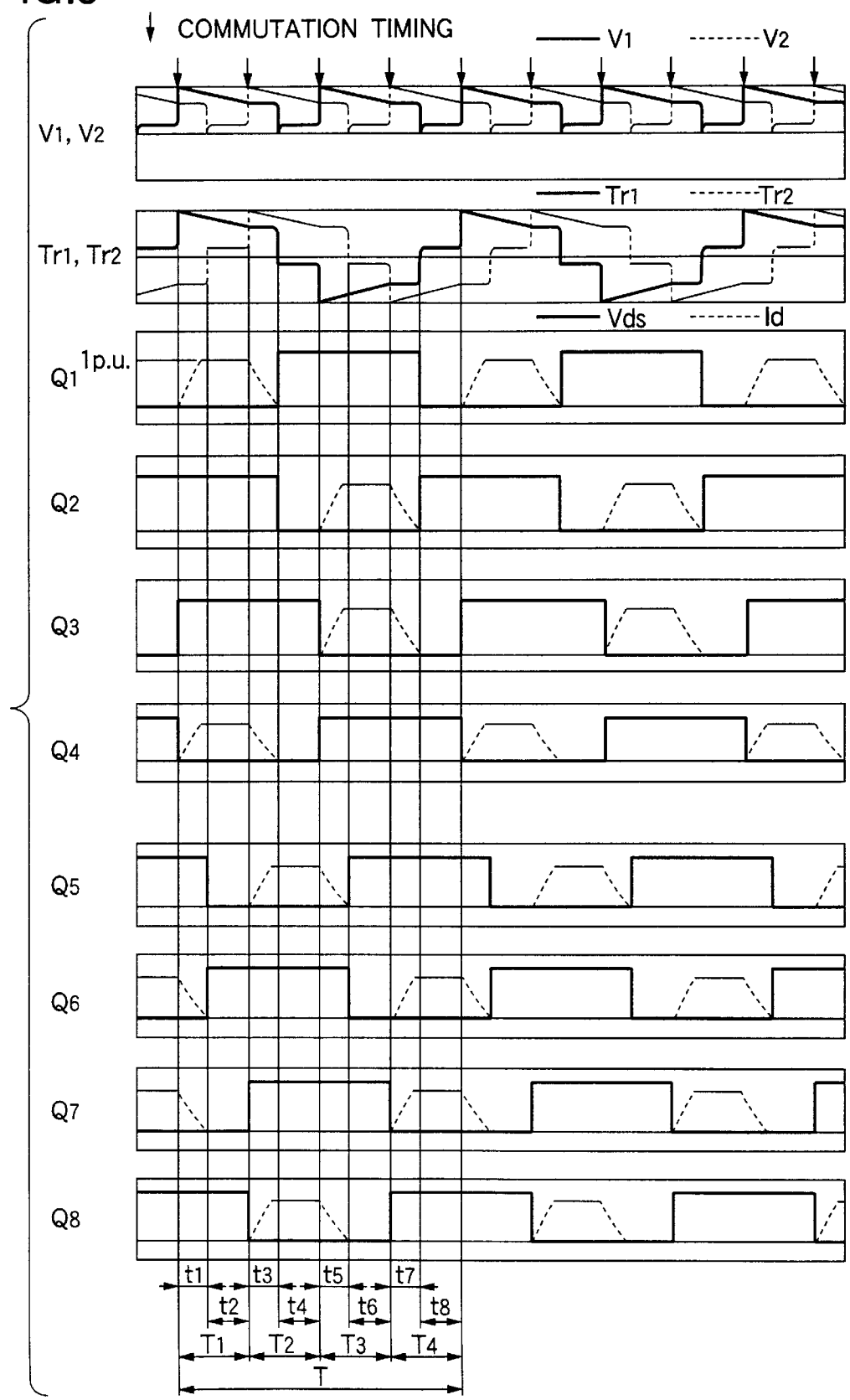
FIG. 3 is a waveform chart of the output voltages of rectifier circuit portions, the primary voltages of the transformers and the drain-source voltages and drain currents of the switching elements in FIG. 1.

Embodiments of a DC—DC converter and a bi-directional DC—DC converter according to the invention will be described below in detail. FIG. 1 is a circuit diagram of the DC—DC converter according to the first embodiment of the invention. FIG. 2 is a timing chart of gate signals for turning on/off respective switching elements $Q_1$ to $Q_8$ in the DC—DC converter. FIG. 3 is a waveform chart of output voltages $V_1$ and $V_2$ of rectifier circuit portions 21 and 22, primary voltages of transformers $Tr_1$ and $Tr_2$ and drain-source voltages $V_{ds}$ and drain currents $I_d$ of the respective switching elements $Q_1$ to $Q_8$.

In the first embodiment, the DC—DC converter has n sets (for example, two sets) of converter circuit portions 11 and 12, two transformers $Tr_1$ and $Tr_2$, two sets of rectifier circuit portions 21 and 22, and an LC smoothing circuit 33. The two sets of converter circuit portions 11 and 12 respectively include two pairs of switching elements $Q_1$, $Q_4$ and $Q_2$, $Q_3$, and two pairs of switching elements $Q_5$, $Q_8$ and $Q_6$, $Q_7$ (such as MOS-FETs, bipolar transistors or IGBTs) connected in full bridge configuration. The two transformers $Tr_1$ and $Tr_2$ are connected to output sides of the converter circuit portions 11 and 12 respectively. The two sets of rectifier circuit portions 21 and 22 are connected to secondary output sides of the transformers $Tr_1$ and $Tr_2$ respectively and include two pairs of diodes $D_1$, $D_4$ and $D_2$, $D_3$, and two pairs of switching elements $D_5$, $D_8$ and $D_6$, $D_7$, respectively. The rectifier circuit portions 21 and 22 are connected to the LC smoothing circuit 33 in common. In the DC—DC converter, the two sets of converter circuit portions 11 and 12 are series-connected to a DC power source E. Further, series capacitors $C_1$ and $C_2$ are inserted and connected between the output sides of the converter circuit portions 11 and 12 and the primary sides of the transformers $Tr_1$ and $Tr_2$ respectively.

In the DC—DC converter, the switching elements $Q_1$, $Q_4$ and $Q_2$, $Q_3$ in the converter circuit portion 11 and the switching elements $Q_5$, $Q_8$ and $Q_6$, $Q_7$ in the converter circuit portion 12 are turned on/off alternately as shown in the timing chart of FIG. 2 to thereby obtain AC waveform outputs. The AC waveform outputs of the converter circuit portions 11 and 12 are transformed by the transformers $Tr_1$ and $Tr_2$ respectively. The secondary outputs of the transformers $Tr_1$ and $Tr_2$ are rectified by the rectifier circuit portions 21 and 22 respectively and smoothed by the LC smoothing circuit 33 to thereby generate a desired DC voltage.

In the two sets of converter circuit portions 11 and 12, as shown in the timing chart of FIG. 2, the switching phase of one switching element $Q_4$ (or switching element $Q_3$ being an inversion of the switching element $Q_4$) in the pair of switching elements $Q_1$ and $Q_4$ of one converter circuit portion 11 is delayed by a 1/3n period (for example, a 1/6 period) relative to that of the other switching element $Q_1$ (or switching element $Q_2$ being an inversion of the switching element $Q_1$. Further, with respect to corresponding switching elements $Q_1$ and $Q_5$ in the converter circuit portions 11 and 12, the switching phase of the switching element $Q_5$ (or switching element $Q_6$ being an inversion of the switching element $Q_5$) in the other converter portion 12 is delayed by a 1/2n period (for example, a 1/4 period) relative to that of the switching element $Q_1$. Further, the switching phase of one switching element $Q_8$ (or switching element $Q_7$ being an inversion of the switching element $Q_8$) in the pair of switching elements $Q_5$ and $Q_8$ of the other converter circuit portion 12 is delayed by a 1/6 period relative to that of the other switching element $Q_5$.

The switching elements $Q_1$ to $Q_4$ in the converter circuit portion 11 and the switching elements $Q_5$ to $Q_8$ in the converter circuit portion 12 perform switching operations (see the table in FIG. 4) with drain-source voltages $V_{ds}$ and drain currents $I_d$, as shown in FIG. 3. Here, FIG. 4 is a table showing the change and transition of current values in the switching elements $Q_1$ to $Q_4$ and the switching elements $Q_5$ to $Q_8$. To supply constant electric power to a load, that is, to supply a constant current to a load under a constant voltage output, the sum of output currents from the switching elements $Q_1$ to $Q_4$ and the switching elements $Q_5$ to $Q_8$ has a current value of 1 p.u. (per unit system) at any timing. Here, the current value of 1 p.u. means the rated current value. That is, when the output current from the switching elements $Q_1$ to $Q_4$ in one converter circuit portion 11 changes from 0 to 1 p.u. at a certain timing, the output current from the switching elements $Q_1$ to $Q_8$ in the other converter circuit portion 12 changes from 1 to 0 p.u. Further, when the output current from the switching elements $Q_1$ to $Q_4$ in one converter circuit portion 11 is 1 p.u. at another timing, the output current from the switching elements $Q_5$ to $Q_8$ in the other converter circuit portion 12 is 0 p.u.

Incidentally, time segments $t_1$ to $t_8$ can be changed freely if those time segments satisfy the conditions $0<t_1 \leq 1/4 \cdot T$, $0 \leq t_2 < 1/4 \cdot T$, $0 < t_3 \leq 1/4 \cdot T$, $0 \leq t_4 < 1/4 \cdot T$, $0 < t_5 \leq 1/4 \cdot T$, $0 \leq t_6 < 1/4 \cdot T$, $0 < t_7 \leq 1/4 \cdot T$ and $0 \leq t_8 < 1/4 \cdot T$ respectively. Although the eight conditions are OR conditions, the time segments $t_1$ to $t_8$ need to satisfy the relation $t_1+t_2+t_3+t_4+t_5+t_6+t_7+t_8=T$. In practice, each of the time segments $t_1$, $t_3$, $t_5$ and $t_7$ in which the current changes is limited within a range without generating any switching loss because the waveform varies in accordance with the circuit constant.

By the switching operations of the switching elements $Q_1$ to $Q_4$ and the switching elements $Q_5$ to $Q_8$, the absolute values of values obtained by multiplying the primary voltages of the transformers $Tr_1$ and $Tr_2$ (on the second stage from the uppermost stage in FIG. 3) by transformation ratios of the transformers $Tr_1$ and $Tr_2$ respectively, that is, values (the uppermost stage in FIG. 3) obtained by folding back the waveforms of the primary voltages at a zero point, are generated as output voltages $V_1$ and $V_2$ which are obtained as a result of rectification of the secondary voltages of the transformers $Tr_1$ and $Tr_2$ by the rectifier circuit portions 21 and 22. The output voltages $V_1$ and $V_2$ of the rectifier circuit portions 21 and 22 are traced at the highest voltage value by commutation to thereby generate a load voltage $V_{out}$. This commutation is repeated in the order of switching elements $Q_1$, $Q_4 \rightarrow$ switching elements $Q_5$, $Q_8 \rightarrow$ switching elements $Q_2$, $Q_3 \rightarrow$ switching elements $Q_6$, $Q_7$ switching elements $Q_1$, $Q_4$ in the timing represented by the arrows in FIG. 3.

In the converter circuit portions 11 and 12, the switching element $Q_4$ ($Q_3$) is turned on/off in the timing delayed by a 1/6 period from the switching element $Q_1$ ($Q_2$), the switching element $Q_5$ ($Q_6$) is turned on/off in the timing delayed by a 1/4 period from the switching element $Q_1$ ($Q_2$), and the switching element $Q_8$ ($Q_7$) is turned on/off in the timing delayed by a 1/6 period from the switching element $Q_5$ ($Q_6$)

Accordingly, there is no switching loss produced in the output voltages $V_1$ and $V_2$ of the rectifier circuit portions 21 and 22 because the state in which drain-source voltages $V_{ds}$ are applied while drain currents $I_d$ flow in the switching elements $Q_1$ to $Q_8$ is eliminated by the commutation. Further, the commutation timing is determined by the switching elements $Q_3$, $Q_4$, $Q_7$ and $Q_8$ which serve as triggers for the commutation. Even in the case where gate signals are given to the switching elements $Q_3$, $Q_4$, $Q_7$ and $Q_8$ so that the switching elements $Q_3$, $Q_4$, $Q_7$ and $Q_8$ are turned on, there is no turn-on switching loss produced, because the leading edges of the drain currents $I_d$ are prevented by leakage reactance of the transformers $Tr_1$ and $Tr_2$ so that the drain currents $I_d$ do not reach peak currents immediately after the commutation.

Further, series capacitors $C_1$ and $C_2$ are inserted and connected between the converter circuit portions 11, 12 and the transformers $Tr_1$, $Tr_2$ respectively. Hence, the flat portions of the output voltages of the converter circuit portions 11 and 12 are drooped (inclined) to generate voltage waveforms having high leading edges respectively. Hence, the difference between voltages before and after the commutation timing is made so large that the commutating operation can be performed steadily. Moreover, DC components which have contained due to variations in ON-resistance and switching speed in accordance with the individual differences of the switching elements $Q_1$ to $Q_4$ and the switching elements $Q_5$ to $Q_8$ may be cut so that DC eccentric excitation of the transformers $Tr_1$ and $Tr_2$ can be prevented.

Figure 23:
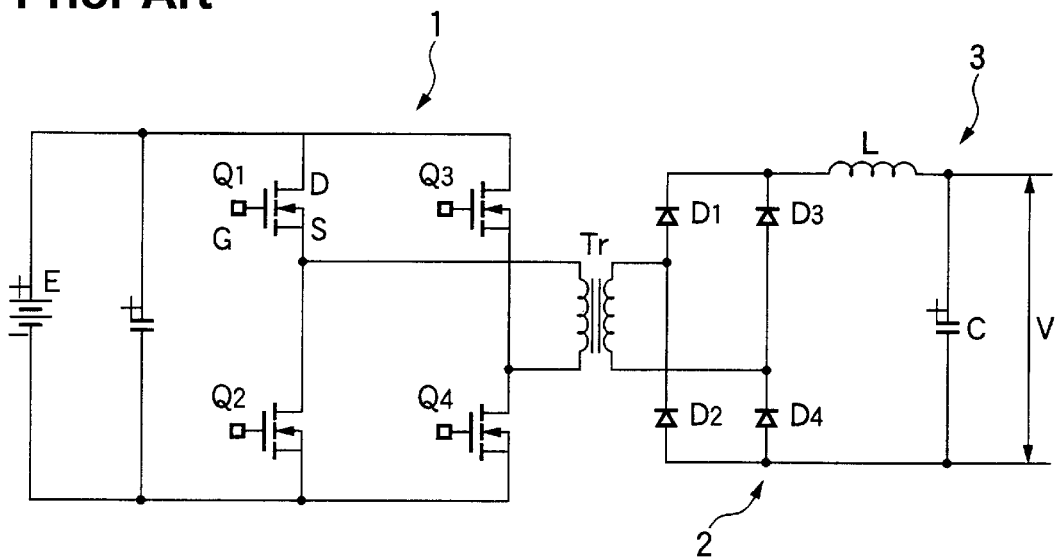
FIG. 23 is a circuit diagram showing an example of a prior-art DC—DC converter.
Figure 24:
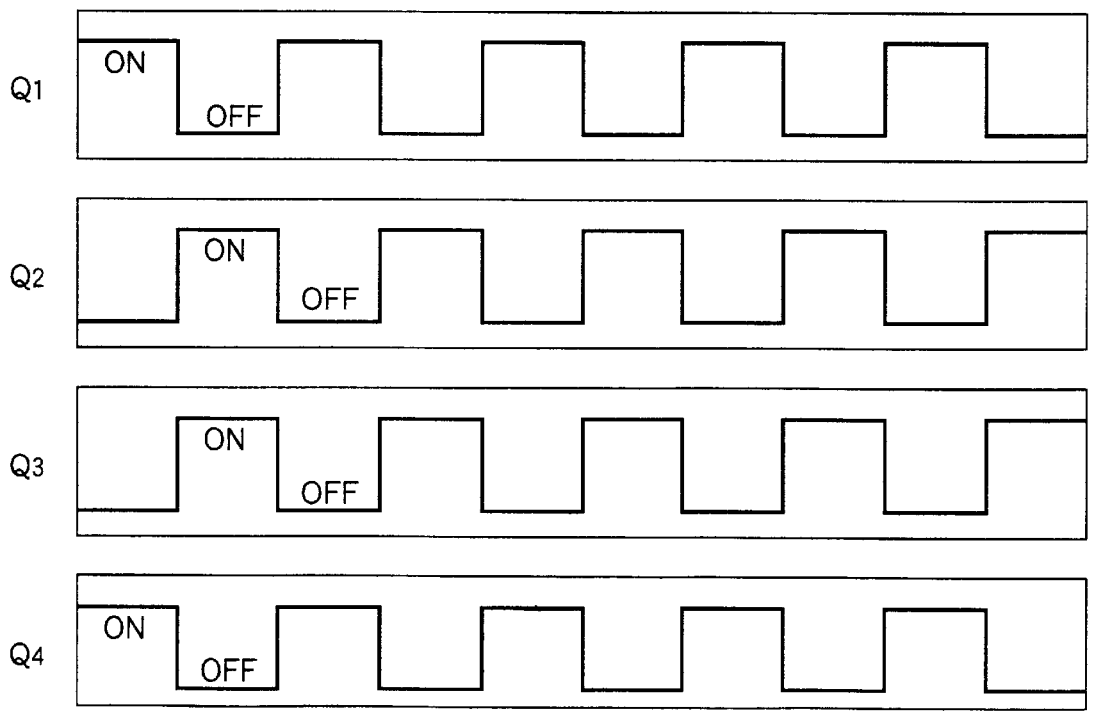
FIG. 24 is a timing chart of gate signals for turning on/off respective switching elements in the DC—DC converter depicted in FIG. 23.

In an embodiment in which the switching elements $Q_1$ to $Q_4$ and the switching elements $Q_5$ to $Q_8$ configured as described above include MOS-FETs, two sets of converter circuit portions 11 and 12 are preferably series-connected to a DC power source E. The voltage (except surge voltage) applied to each of the MOS-FETs in the converter circuit portions 11 and 12 can be reduced to a half of the power source voltage of the DC power source E even at the time of switching. Hence, the withstand voltage of each of the MOS-FETs used as the switching elements $Q_1$ to $Q_4$ and the switching elements $Q_5$ to $Q_8$ can be reduced to a half of that in the prior-art DC—DC converter (see FIG. 23). As a result, conduction loss, due to ON-resistance of increasing in proportion to the $2.5^{th}$ power of the withstand voltage can be prevented.

That is, when the withstand voltage of each of the switching elements $Q_1$ to $Q_4$ and the switching elements $Q_5$ to $Q_8$ is reduced to a half, the ON-resistance thereof is reduced to $(\frac{1}{2})^{2.5}\%$, that is, to about 20% (by 80%). In a switching pattern of one pulse per period, conduction losses of the switching elements $Q_1$ to $Q_4$ and the switching elements $Q_5$ to $Q_8$ are obtained and compared as follows.

In the prior-art DC—DC converter, when the conductivity of each of the switching elements $Q_1$ to $Q_4$ is 50%, the conduction loss $P_{loss1}$ per period (per pulse) of each switching element 1pc (one piece) is $P_{loss1}=r_1 \times i_{d1}^2 \times t_{sw}/2$ in which $r_1$ is the ON-resistance of each of the switching elements $Q_1$ to $Q_4$, $i_{d1}$ is the drain current, and $t_{sw}$ is the switching period.

On the other hand, in the DC—DC converter according to the embodiment, assume that $r_2$ is the ON-resistance of each of the switching elements $Q_1$ to $Q_4$ and the switching elements $Q_5$ to $Q_8$, $i_{d2}$ is the drain current, and $t_{sw}$ is the switching period similarly to that in the prior-art DC—DC converter. As shown in the switching pattern (see FIG. 2) in this embodiment, commutation of current in one period is performed so that current commutation occurs in the switching elements $Q_1$ and $Q_4$ for the first 1/4 period, in the switching elements $Q_5$ and $Q_8$ for the second 1/4 period, in the switching elements $Q_2$ and $Q_3$ for the third 1/4 period, and in the switching elements $Q_6$ and $Q_7$ for the last 1/4 period. Further, the output voltage of one set of converter circuit portion is half as high as that in the case of the prior-art example. To make the final output equal to that in the case of the prior-art example, the drain current $i_{d2}$ per switching element 1pc is set to be twice as large as the drain current $i_{d1}$ in the case of the prior-art example and the conductivity of each of the switching elements $Q_1$ to $Q_4$ and the switching elements $Q_5$ to $Q_8$ is set to be 25% which is half as large as the conductivity in the case of the prior-art example.

Hence, the conduction loss $P_{loss2}$ per period (per pulse) of the switching element 1pc is $P_{loss2}=r_2 \times i_{d2}^2 \times t_{sw}/4$. Here, $i_{d2}=2\times i_{d1}$ and $r_2/r_1=0.2$ because $r_2$ is about 20% of $r_1$. Hence, the conduction loss $P_{loss2}$ is given as follows.

$$P_{loss2} = (0.2 \times r_1) \times (2 \times i_{d1})^2 \times t_{sw}/4$$
$$= 0.4 \times r_1 \times i_{d1}^2 \times t_{sw}/2$$
$$= 0.4 \times P_{loss1}$$

This shows the fact that the conduction loss in this embodiment is reduced to 40% (−60%) of that in the case of the prior-art example. According to this fact, the sum of all the switching elements full-bridge-connected in the converter circuit portions 11 and 12 can be considered as followed. Because switching elements 8pc are provided in this embodiment whereas switching elements 4pc are provided in the prior-art example, the total conduction loss of the all switching elements (8pc) in this embodiment is 80% (−20%), that is, the total conduction loss is reduced by 20% when the total conduction loss of the all switching elements (4pc) in the prior-art example is 100%.

Figure 5:
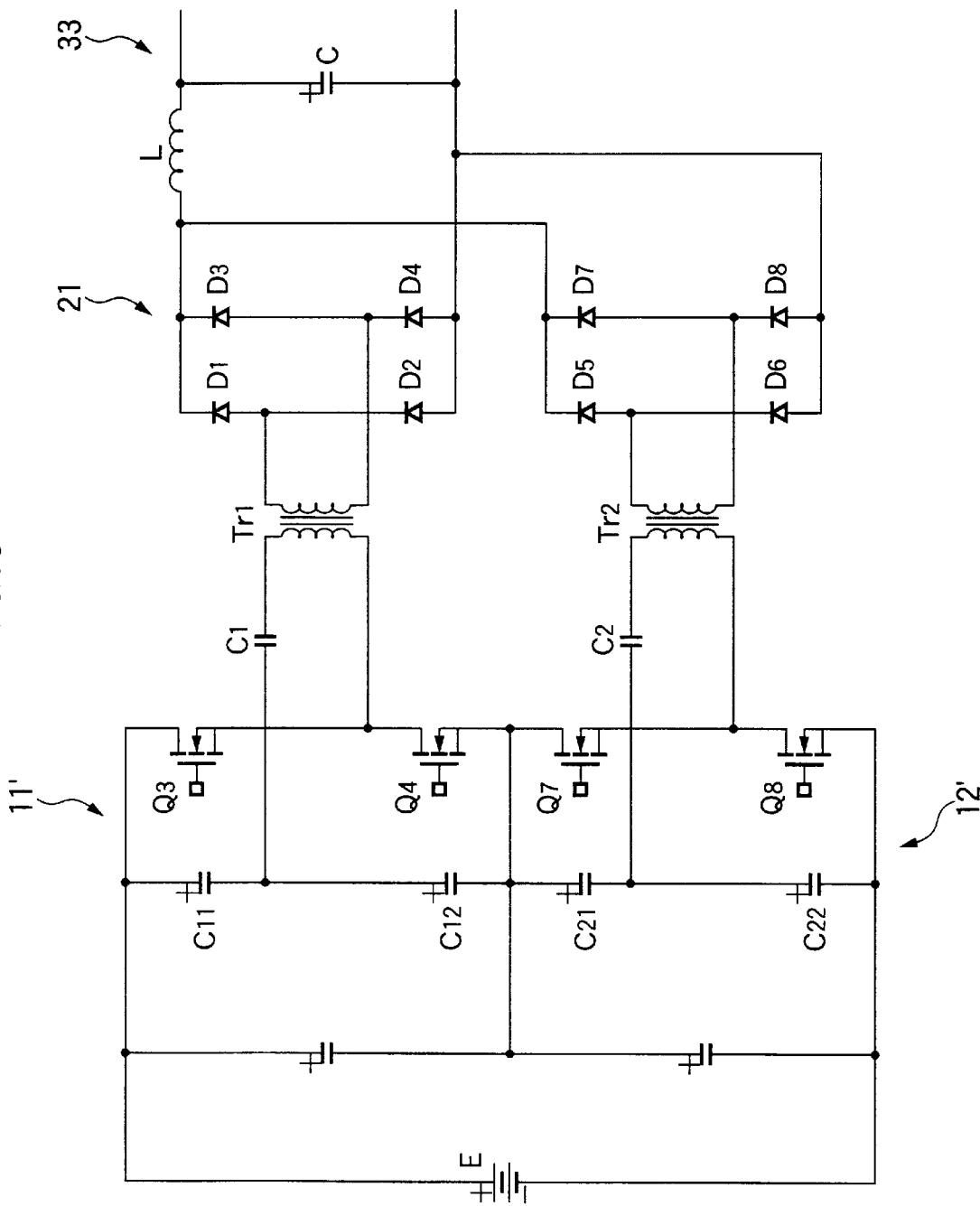
FIG. 5 is a circuit diagram showing a DC—DC converter having converter circuit portions in half bridge configuration according to a second embodiment of the invention.

FIG. 5 shows the DC—DC converter according to the second embodiment of the invention. In the second embodiment of the invention, two sets of converter circuit portions 11' and 12' is configured as half bridges respectively. In the two sets of converter circuit portions 11' and 12', switching elements $Q_3$, $Q_4$, $Q_7$ and $Q_8$ serve as triggers for commutation to determine the commutation timing. Hence, the other switching elements $Q_1$, $Q_2$, $Q_5$ and $Q_6$ may be replaced by capacitors $C_{11}$, $C_{12}$, $C_{21}$ and $C_{22}$ respectively to thereby form the half bridge configuration. The timing (phase) for switching each of the switching elements $Q_3$, $Q_4$, $Q_7$ and $Q_8$ in this embodiment is the same as that for the case of full bridge configuration.

Figure 6:
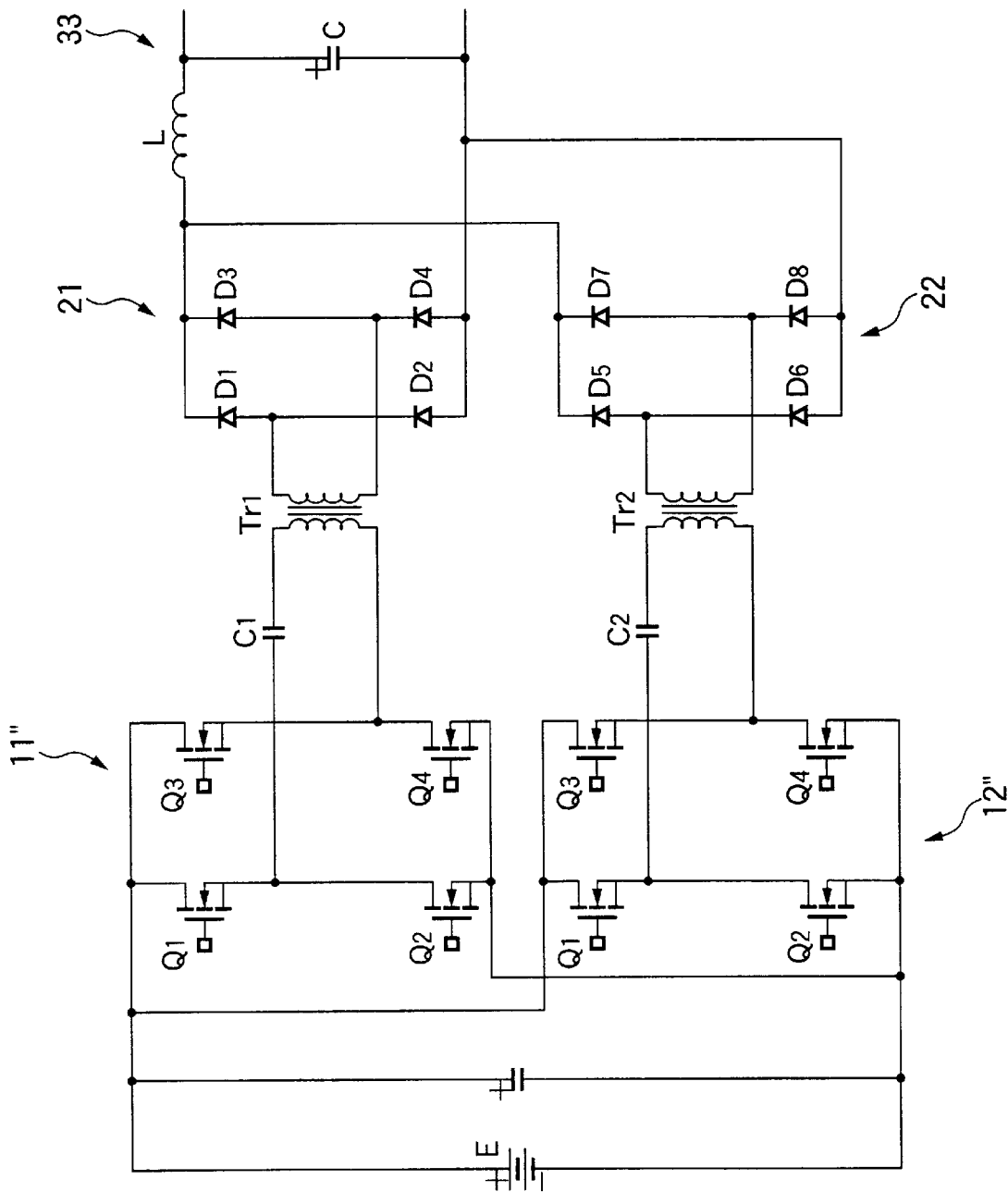
FIG. 6 is a circuit diagram showing a DC—DC converter having two sets of converter circuit portions series-connected to a DC power source according to a third embodiment of the invention.

FIG. 6 shows the DC—DC converter according to the third embodiment of the invention. In the third embodiment of the invention, two sets of converter circuit portions 11" and 12" are parallel-connected to a DC power source E. In this case, production of switching loss can be prevented. In addition, in this embodiment, the timing (phase) for switching each of the switching elements $Q_1$ to $Q_4$ and the switching elements $Q_5$ to $Q_8$ is the same as that for the case of full bridge configuration.

Figure 7:
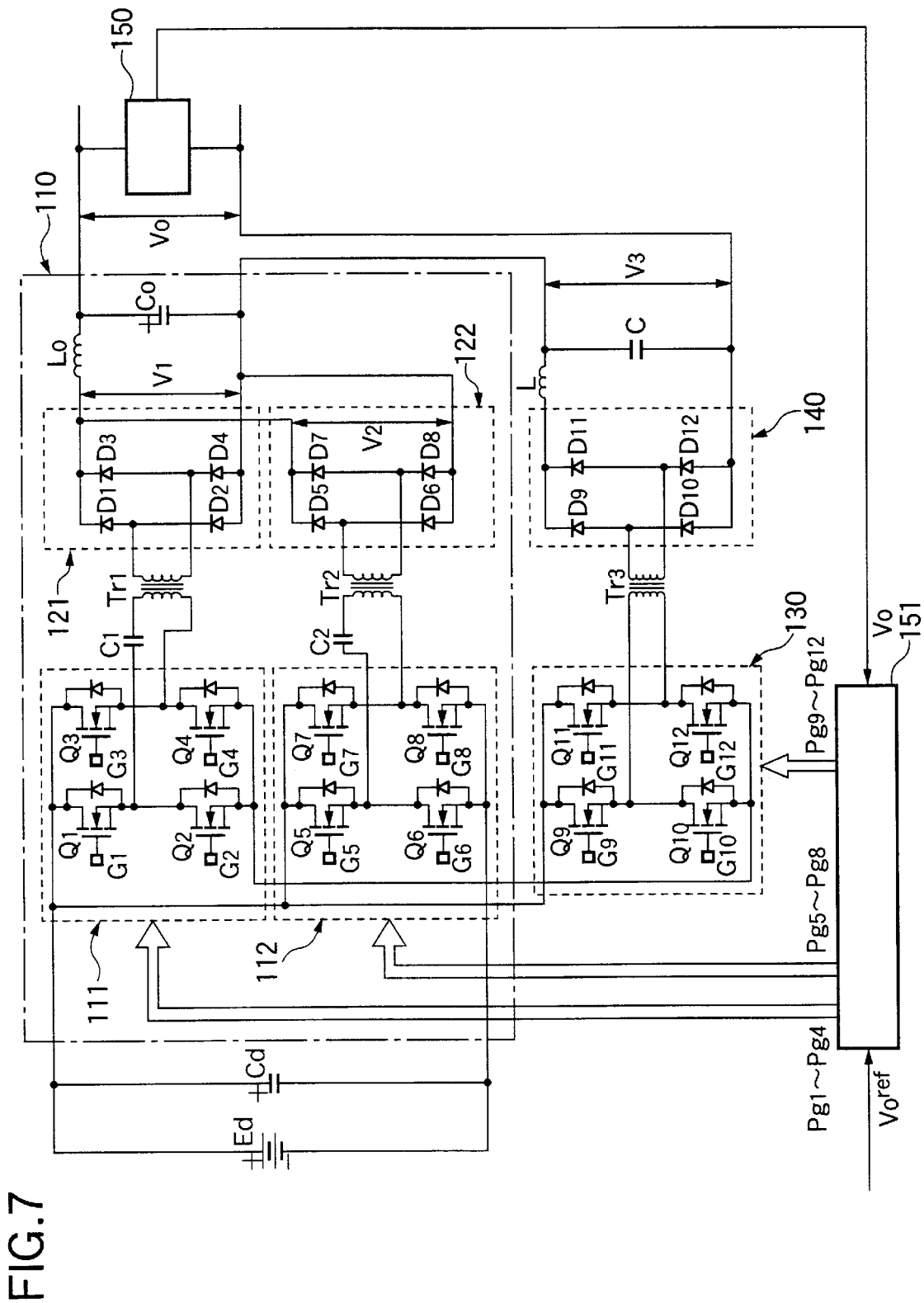
FIG. 7 is a circuit diagram of a DC—DC converter according to a fourth embodiment of the invention.
Figure 8:
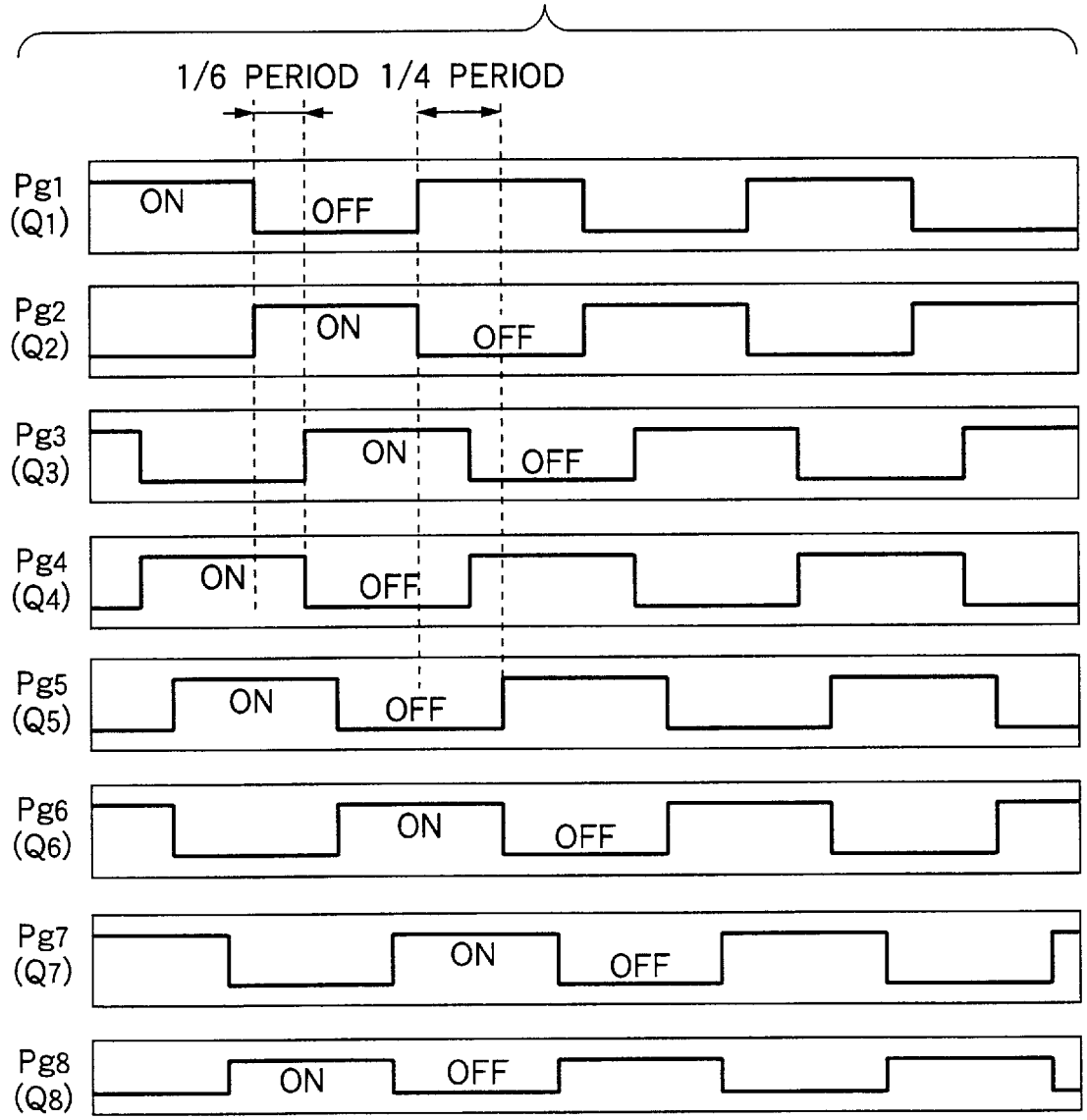
FIG. 8 is a timing chart of gate signals for turning on/off respective switching elements in the DC—DC converter depicted in FIG. 7.
Figure 9:
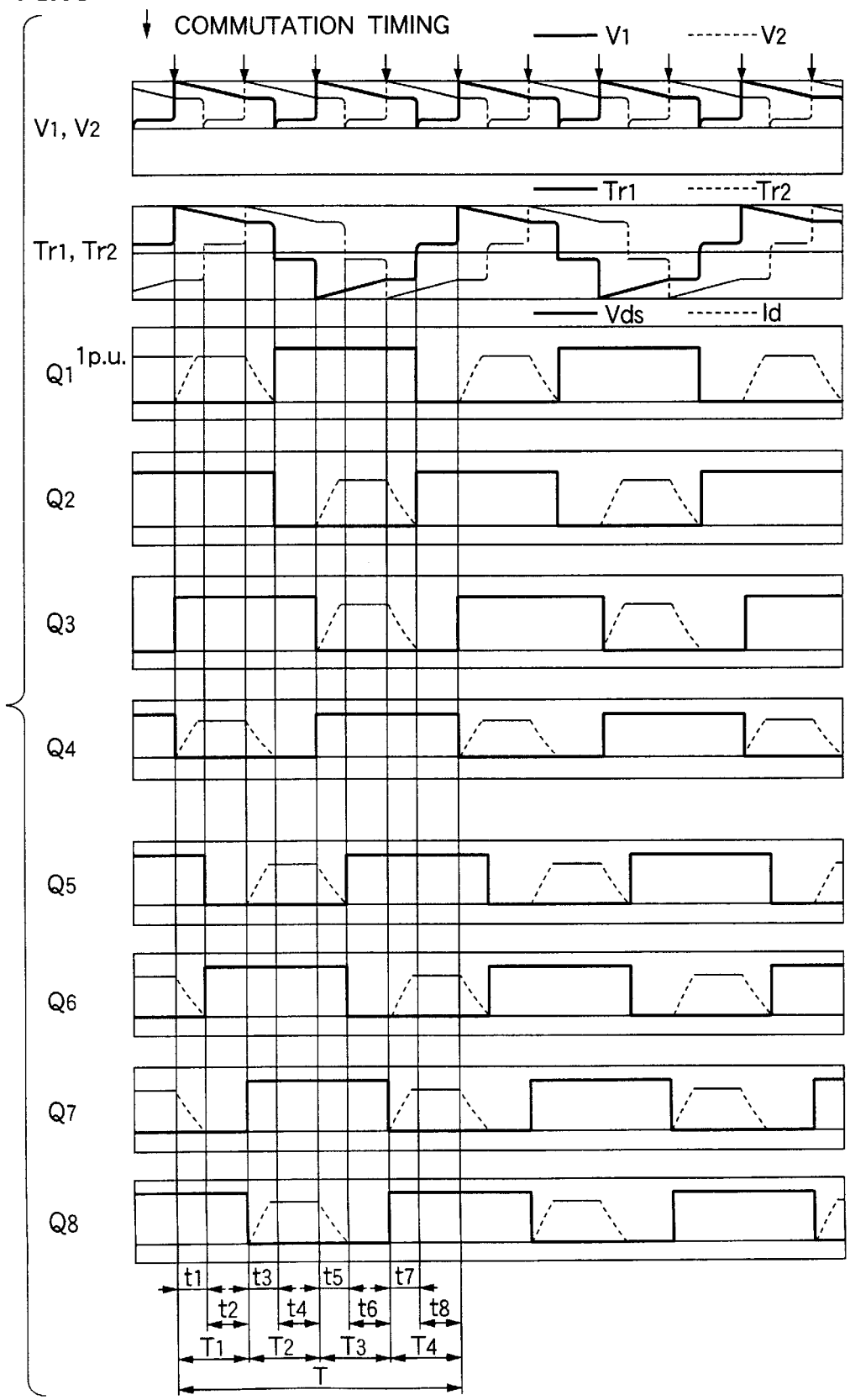
FIG. 9 is a waveform chart of the output voltages of rectifier circuit portions, the primary voltages of the transformers and the drain-source voltages and drain currents of the switching elements in FIG. 7.

FIG. 7 is a circuit diagram of the DC—DC converter according to the fourth embodiment of the invention. FIG. 8 is a timing chart of gate signals $Pg_1$ to $Pg_4$ and $Pg_5$ to $Pg_8$ for turning on/off respective switching elements $Q_1$ to $Q_4$ and $Q_5$ to $Q_8$ in the DC—DC converter. FIG. 9 is a waveform chart of output voltages $V_1$ and $V_2$ of rectifier circuit portions 121 and 122, primary voltages of transformers $Tr_1$ and $Tr_2$ and drain-source voltages Vds and drain currents Id of the respective switching elements $Q_1$ to $Q_4$ and $Q_5$ to $Q_8$.

In this embodiment, the DC—DC converter has a main circuit 110 including n sets (for example, two sets) of converter circuit portions 111 and 112, two transformers $Tr_1$ and $Tr_2$, two sets of rectifier circuit portions 121 and 122, and a smoothing circuit portion LoCo. The two sets of converter circuit portions 111 and 112 respectively include two pairs of switching elements $Q_1$, $Q_4$ and $Q_2$, $Q_3$, and two pairs of switching elements $Q_5$, $Q_8$ and $Q_6$, $Q_7$ (such as MOS-FETs, bipolar transistors or IGBTs) connected in full bridge configuration. The two transformers $Tr_1$ and $Tr_2$ are connected to output sides of the converter circuit portions 111 and 112 respectively. The two sets of rectifier circuit portions 121 and 122 are connected to secondary output sides of the transformers $Tr_1$ and $Tr_2$ respectively and include two pairs of diodes $D_1$, $D_4$ and $D_2$, $D_3$, and two pairs of switching elements $D_5$, $D_8$ and $D_6$, $D_7$, respectively. The rectifier circuits 121 and 122 are connected to the smoothing circuit portion LoCo in common.

In the main circuit 110, the two sets of converter circuit portions 111 and 112 are parallel-connected to a DC power source Ed which is a secondary battery such as a lead storage battery or a fuel battery. The two sets of rectifier circuit portions 121 and 122 are also connected in parallel to each other. Further, series capacitors $C_1$ and $C_2$ are inserted and connected between the output sides of the converter circuit portions 111 and 112 and the primary sides of the transformers $Tr_1$ and $Tr_2$ respectively. Incidentally, the switching elements $Q_1$ to $Q_4$ and $Q_5$ to $Q_8$ in the converter circuit portions 111 and 112 contain anti-parallel FWDs (Free Wheeling Diodes: hereinafter referred to as anti-parallel diodes). The anti-parallel diodes are, for example, structurally equivalent devices which exist in anti-parallel to MOS-FETs.

As shown in the timing chart of FIG. 8, a control portion 151 of the DC—DC converter turns on/off the switching elements $Q_1$, $Q_4$ and $Q_2$, $Q_3$ in the converter circuit portion 111 and the switching elements $Q_5$, $Q_8$ and $Q_6$ and $Q_7$ in the converter circuit portion 112 alternately on the basis of gate signals $Pg_1$ to $Pg_4$ and $Pg_5$ to $Pg_8$. The AC waveform outputs of the converter circuit portions 111 and 112 obtained by turning on/off the switching elements $Q_1$ to $Q_4$ and $Q_5$ to $Q_8$ are transformed by the transformers $Tr_1$ and $Tr_2$ respectively. The secondary outputs of the transformers $Tr_1$ and $Tr_2$ are rectified by the rectifier circuit portions 121 and 122 respectively and smoothed by a smoothing circuit portion LoCo to thereby generate a desired DC output voltage Vo.

In the two sets of converter circuit portions 111 and 112, as shown in the timing chart of FIG. 8, the switching phase of one switching element $Q_4$ (or switching element $Q_3$ being an inversion of the switching element $Q_4$) in the pair of switching elements $Q_1$ and $Q_4$ of one converter circuit portion 111 is delayed by a 1/3n period (for example, a 1/6 period) relative to that of the other switching element $Q_1$ (or switching element $Q_2$ being an inversion of the switching element $Q_1$). Further, with respect to corresponding switching elements $Q_1$ and $Q_5$ in the converter circuit portions 111 and 112, the switching phase of the switching element $Q_5$ (or switching element $Q_6$ being an inversion of the switching element $Q_5$) in the other converter portion 112 is delayed by a 1/2n period (for example, a 1/4 period) relative to that of the switching element $Q_1$. Further, the switching phase of one switching element $Q_8$ (or switching element $Q_7$ being an inversion of the switching element $Q_8$) in the pair of switching elements $Q_5$ and $Q_8$ of the other converter circuit portion 112 is delayed by a 1/6 period relative to that of the other switching element $Q_5$.

The switching elements $Q_1$ to $Q_4$ in the converter circuit portion 111 and the switching elements $Q_5$ to $Q_8$ in the converter circuit-portion 112 perform switching operations (see the table in FIG. 10) with drain-source voltages Vds and drain currents Id, as shown in FIG. 9. Here, FIG. 10 is a table showing the change and transition of current values in the switching elements $Q_1$ to $Q_4$ and the switching elements $Q_5$ to $Q_8$. To supply constant electric power to a load, that is, to supply a constant current to a load under a constant voltage output, the sum of output currents from the switching elements $Q_1$ to $Q_4$ and the switching elements $Q_5$ to $Q_8$ has a current value of 1 p.u. at any timing. That is, when the output current from the switching elements $Q_1$ to $Q_4$ in one converter circuit portion 111 changes from 0 to 1 p.u. at a certain timing, the output current from the switching elements $Q_5$ to $Q_8$ in the other converter circuit portion 112 changes from 1 to 0 p.u. Further, when the output current from the switching elements $Q_1$ to $Q_4$ in one converter circuit portion 111 is 1 p.u. at another timing, the output current from the switching elements $Q_5$ to $Q_8$ in the other converter circuit portion 112 is 0 p.u.

Incidentally, time segments $t_1$ to $t_8$ can be changed freely if those time segments satisfy the conditions $0<t_1 \leq 1/4 \cdot T$, $0 \leq t_2 < 1/4 \cdot T$, $0 < t_3 \leq 1/4 \cdot T$, $0 \leq t_4 < 1/4 \cdot T$, $0 < t_5 \leq 1/4 \cdot T$, $0 \leq t_6 < 1/4 \cdot T$, $0 < t_7 \leq 1/4 \cdot T$ and $0 \leq t_8 < 1/4 \cdot T$ respectively. Although the eight conditions are OR conditions, the time segments $t_1$ to $t_8$ need to satisfy the relation $t_1+t_2+t_3+t_4+t_5+t_6+t_7+t_8=T$. In practice, each of the time segments $t_1$, $t_3$, $t_5$ and $t_7$ in which the current changes is limited within a range without generating any switching loss because the waveform varies in accordance with the circuit constant.

By the switching operations of the switching elements $Q_1$ to $Q_4$ and the switching elements $Q_5$ to $Q_8$, the absolute values of values obtained by multiplying the primary voltages of the transformers $Tr_1$ and $Tr_2$ (on the second stage from the uppermost stage in FIG. 9) by transformation ratios of the transformers $Tr_1$ and $Tr_2$ respectively, that is, values (the uppermost stage in FIG. 9) obtained by folding back the waveforms of the primary voltages at a zero point, are generated as output voltages $V_1$ and $V_2$ which are obtained as a result of rectification of the secondary voltages of the transformers $Tr_1$ and $Tr_2$ by the rectifier circuit portions 121 and 122. The output voltages $V_1$ and $V_2$ of the rectifier circuit portions 121 and 122 are traced at the highest voltage value by commutation to thereby generate the output voltage Vo. This commutation is repeated in the order of switching elements $Q_1$, $Q_4 \rightarrow$ switching elements $Q_5$, $Q_8 \rightarrow$ switching elements $Q_2$, $Q_3 \rightarrow$ switching elements $Q_6$, $Q_7$ switching elements $Q_1$, $Q_4$ in the timing represented by the arrows in FIG. 9.

These switching elements $Q_1$ to $Q_4$ and $Q_5$ to $Q_8$ are turned on/off in the timing in which switching phases are shifted. Hence, there is no switching loss produced in the output voltages $V_1$ and $V_2$ of the rectifier circuit portions 121 and 122 because the state in which drain-source voltages Vds are applied while drain currents Id flow in the switching elements $Q_1$ to $Q_4$ and $Q_5$ to $Q_8$ is eliminated by the commutation. Further, the commutation timing is determined by the switching elements $Q_3$, $Q_4$, $Q_7$ and $Q_8$ which serve as triggers for the commutation. Even in the case where gate signals are given to the switching elements $Q_3$, $Q_4$, $Q_7$ and $Q_8$ so that the switching elements $Q_3$, $Q_4$, $Q_7$ and $Q_8$ are turned on, there is no turn-on switching loss produced because the leading edges of the drain currents Id are prevented by leakage reactance of the transformers $Tr_1$ and $Tr_2$ so that the drain currents Id do not reach peak currents immediately after the commutation.

Further, series capacitors $C_1$ and $C_2$ are inserted and connected between the converter circuit portions 111 and 112 and the transformers $Tr_1$, $Tr_2$ respectively. Hence, the flat portions of the output voltages of the converter circuit portions 111 and 112 are drooped (inclined) to form voltage waveforms having high leading edge portions respectively. Hence, the difference between voltages before and after the commutation timing is made large so that the commutating operation can be performed steadily. Moreover, DC components contained by variations in ON-resistance and switching speed in accordance with the individual differences of the switching elements $Q_1$ to $Q_4$ and $Q_5$ to $Q_8$ may be cut so that DC eccentric excitation of the transformers $Tr_1$ and $Tr_2$ can be prevented.

In the embodiment shown in FIG. 7, a DC voltage detector 150 which is a voltage detecting unit is provided on the output side of the rectifier circuit portions 121 and 122. A voltage compensating portion 130, 140 is additionally provided so that the output voltage Vo is adjusted by a correcting instruction output from the control portion 151 on the basis of the signal detected by the DC voltage detector 150. The voltage compensating portion has a voltage compensating converter circuit portion 130, and a voltage compensating rectifier circuit portion 140 provided on the output side of the voltage compensating converter circuit portion 130 through a transformer $Tr_3$. The voltage compensating converter circuit portion 130 contains two pairs of switching elements $Q_9$ to $Q_{12}$ connected in full bridge configuration and is parallel-connected to the converter circuit portions 111 and 112 in the main circuit 110. The voltage compensating rectifier circuit portion 140 is series-connected to the rectifier circuit portions 121 and 122 in the main circuit 10.

Incidentally, when a secondary battery, a fuel battery is used as the DC power source Ed, the input voltage of the DC power source Ed varies in a range not smaller than 70% of the rated voltage of the DC power source Ed. In a state in which the input voltage is reduced to be smaller than 70% of the rated voltage, it is unnecessary to adjust the voltage because this state means that the DC power source Ed cannot be used. Therefore, the turn ratio between the transformers $Tr_1$ and $Tr_2$ are determined so that the output voltage Vo takes a voltage value corresponding to an instructed output voltage value when the voltage of the DC power source Ed is highest and the output load capacity is zero (unload time). Hence, the fluctuation (abatement) of the output voltage Vo in accordance with the fluctuation of the input voltage due to increase in electric power consumed by the load is compensated by the voltage compensating converter circuit portion 130 and the voltage compensating rectifier circuit portion 140.

Figure 11:
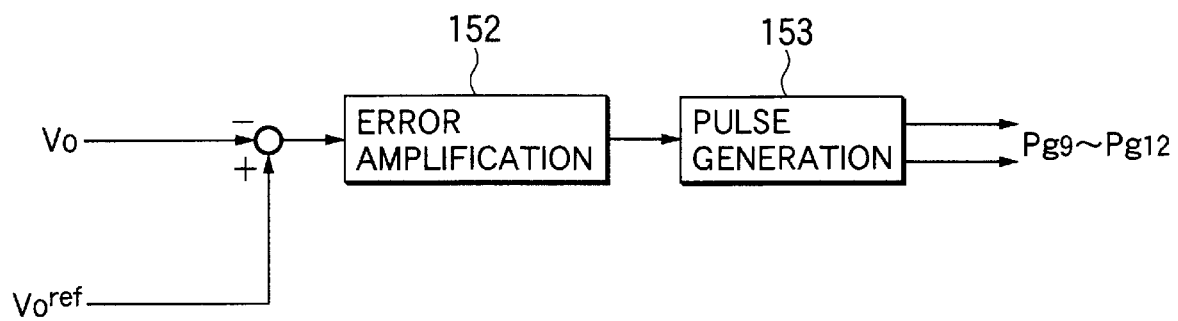
FIG. 11 is a block diagram showing an example of control in a voltage compensating portion in the embodiment shown in FIG. 7.

The output voltage Vo of the rectifier circuit portions 121 and 122 in the main circuit 110 is detected by the voltage detecting unit 150. In the control portion 151, as shown in FIG. 11, the output voltage Vo detected thus is compared with an instructed output voltage value $Vo^{ref}$ determined in advance. Error between the output voltage Vo and the instructed output voltage value $Vo^{ref}$ as a result of the comparison is amplified by an error amplifying circuit 152. Voltage compensating gate signals $Pg_9$ to $Pg_{12}$ for turning on/off the switching elements $Q_9$ to $Q_{12}$ in the voltage compensating converter circuit portion 130 are generated by a pulse generating circuit 153 so that a compensating voltage $V_3$ is generated in accordance with the error between the output voltage Vo and the instructed output voltage value $Vo^{ref}$.

Figure 12:
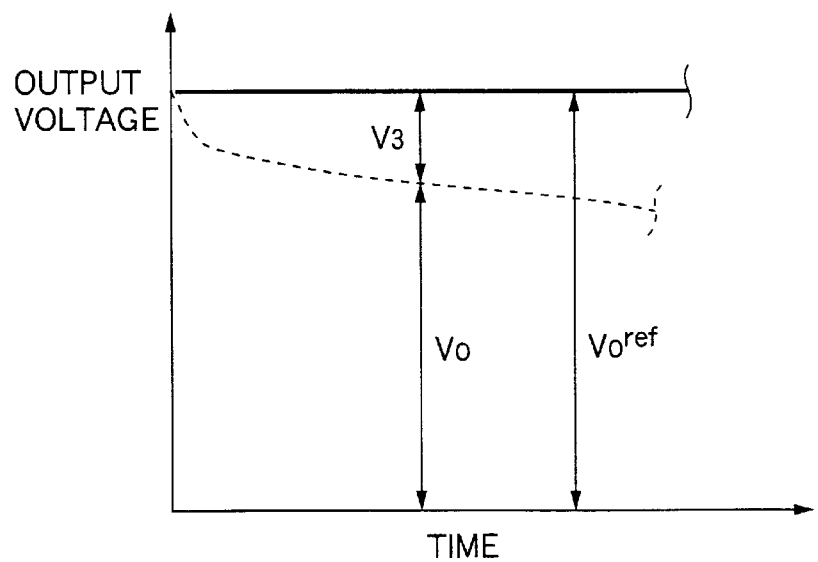
FIG. 12 is a waveform chart for explaining the gist of voltage compensation in the embodiment shown in FIG. 7.

The switching elements $Q_9$, $Q_{12}$ and $Q_{10}$, $Q_{11}$ in the voltage compensating converter circuit portion 130 are turned on/off alternately on the basis of the gate signals $Pg_9$ to $Pg_{12}$. The AC waveform output of the voltage compensating converter circuit portion 130 obtained by turning on/off the switching elements $Q_9$ to $Q_{12}$ is transformed by the transformer $Tr_3$. The secondary output of the transformer $Tr_3$ is rectified by the voltage compensating rectifier circuit portion 140 and smoothed by the smoothing circuit portion LC to thereby generate a compensating voltage $V_3$. As a result, the compensating voltage $V_3$ output from the voltage compensating rectifier circuit portion 140 is added to the output voltage Vo of the rectifier circuit portions 121 and 122 in the main circuit 110 as shown in FIG. 12. Hence, a voltage equivalent to the instructed output voltage value $Vo^{ref}$ can be output, so that the fluctuation (abatement) of the output voltage in accordance with the fluctuation of the input voltage of the DC power source Ed can be compensated.

Figure 13:
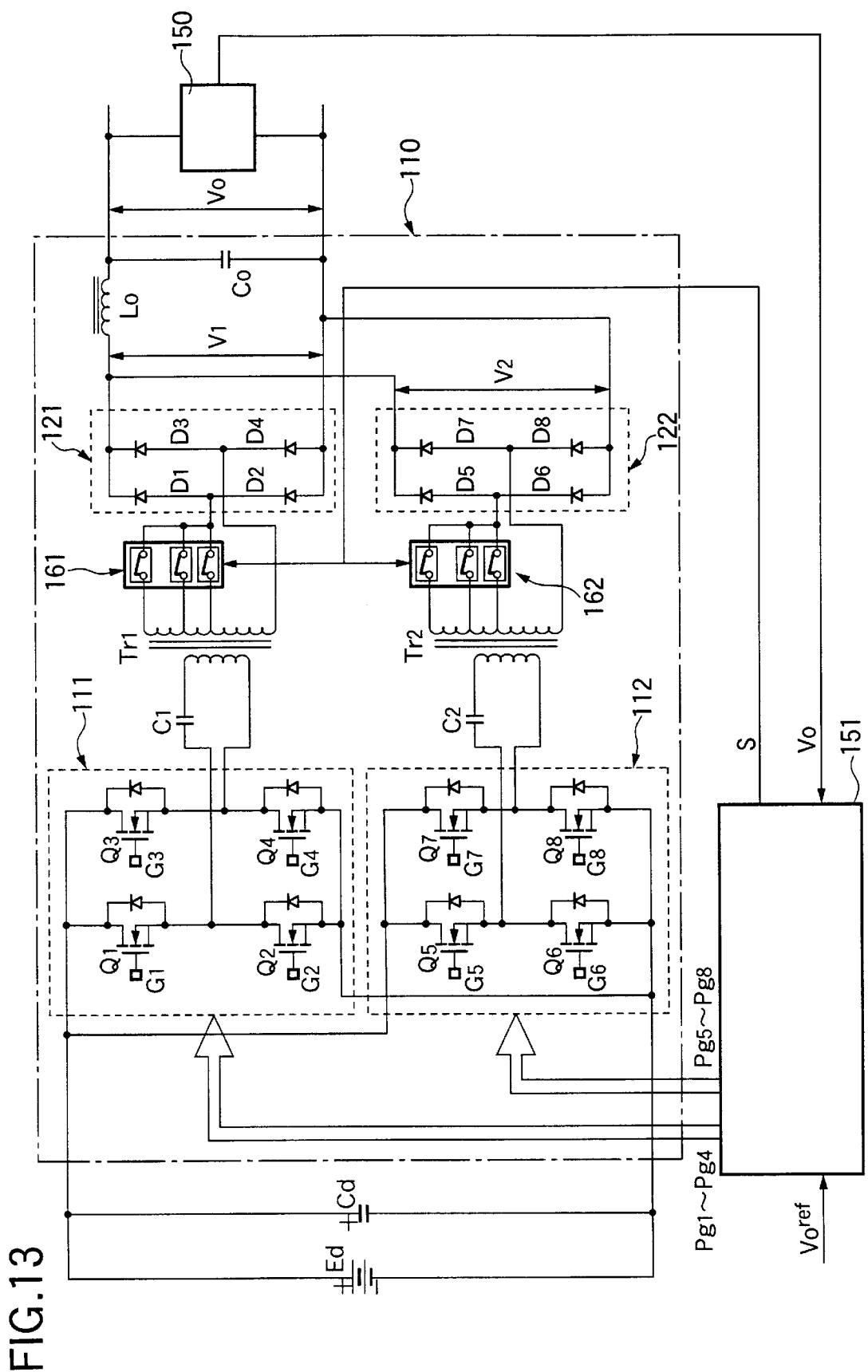
FIG. 13 is a circuit diagram of a DC—DC converter according to a fifth embodiment of the invention.

FIG. 13 shows a voltage compensating portion for the purpose of compensating the fluctuation (abatement) of the output voltage Vo in accordance with the fluctuation of the input voltage of the DC power source Ed in the DC—DC converter of the fifth embodiment. The voltage compensating portion includes tap changing circuits 161 and 162 which are provided between the transformers $Tr_1$, $Tr_2$ and the rectifier circuit portions 121, 122 in the main circuit 110 for changing taps in the secondary windings of the transformers $Tr_1$ and $Tr_2$ respectively.

In the control portion 151, the output voltage Vo of the rectifier circuit portions 121 and 122 in the main circuit 110 is detected by the voltage detecting unit 150. As shown in FIG. 14, the output voltage Vo detected thus is compared with the instructed output voltage value $Vo^{ref}$ which is set in advance. Error between the output voltage Vo and the instructed output voltage value $Vo^{ref}$ as a result of the comparison is amplified by the error amplifying circuit 152. Signals S for selecting taps in the secondary windings of the transformers $Tr_1$ and $Tr_2$ in accordance with the error between the output voltage Vo and the instructed output voltage value $Vo^{ref}$ are generated by a selection signal generating circuit 154. The tap selection signals S are sent from the control portion 151 to the tap changing circuits 161 and 162, so that taps in the secondary windings of the transformers $Tr_1$ and $Tr_2$ are changed by the tap changing circuits 161 and 162 respectively.

By the tap changing, the voltage generated on the secondary side of each of the transformers $Tr_1$ and $Tr_2$ is increased by a compensating voltage $V_3$ equivalent to the error between the output voltage Vo and the instructed output voltage value $Vo^{ref}$ as shown in FIGS. 15A to 15C. As a result, a voltage equivalent to the instructed output voltage value $Vo^{ref}$ can be output; so that the fluctuation (abatement)

of the output voltage in accordance with the fluctuation of the input voltage of the DC power source Ed can be compensated. Incidentally, a more stable output voltage Vo can be generated by increasing the number of taps provided in the secondary winding of each of the transformers $Tr_1$ and $Tr_2$. FIGS. 15A to 15C show the case where the number of taps is increased successively. In FIG. 15A, a sawtooth output voltage is obtained by changing the tap. When the number of taps is increased, an approximately linear output voltage as shown in FIG. 15C can be obtained even in the case where the taps are changed.

Figure 16:
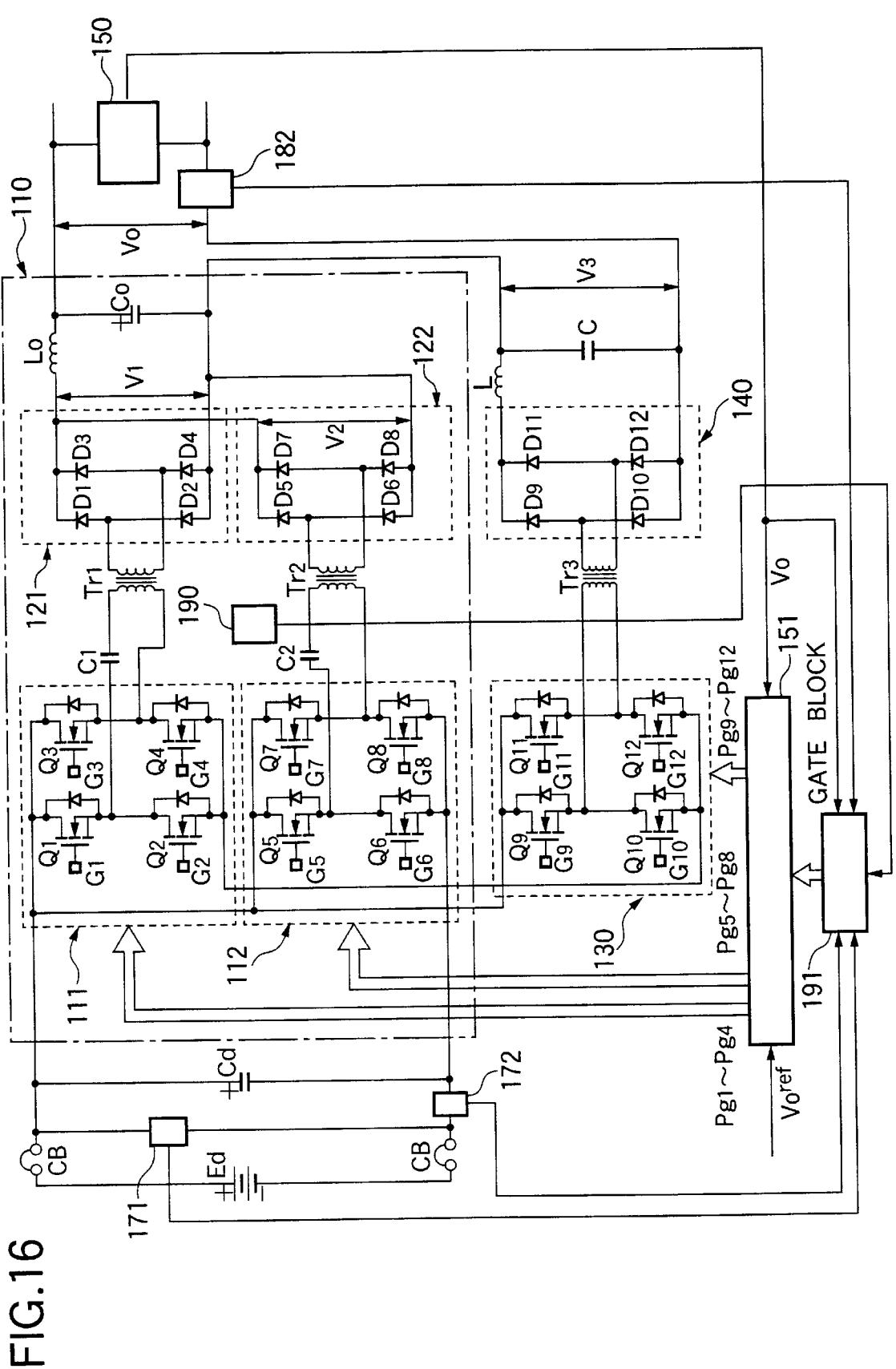
FIG. 16 is a circuit diagram of a DC—DC converter according to a sixth embodiment of the invention in which a protecting function is added to the DC—DC converter depicted in FIG. 7.

FIG. 16 shows a DC—DC converter according to a sixth embodiment of the invention in which a protecting function is added to the embodiment shown in FIG. 7. Incidentally, it is a matter of course that the protecting function can be applied also to the embodiment shown in FIG. 13. In the DC—DC converter shown in FIG. 16, a voltage detecting unit 171 and a current detecting unit 172 which form an fault detecting unit are provided on the DC power source Ed side of the converter circuit portions 111 and 112 in the main circuit 110. Further, a current detecting unit 182 is provided as an fault detecting unit in addition to the voltage detecting unit 150 on the output side of the rectifier circuit portions 121 and 122. Moreover, a temperature sensor 190 is disposed as an fault detecting unit for detecting overheating of the converter circuit portions 111 and 112 and the rectifier circuit portions 121 and 122 in the main circuit 110.

An fault judging circuit 191 is provided so that gate blocking signals for blocking the gate signals $Pg_1$ to $Pg_4$ and $Pg_5$ to $Pg_8$ for driving the switching elements $Q_1$ to $Q_4$ and $Q_5$ to $Q_8$ respectively are output from the fault judging circuit 191 on the basis of the signals detected by the voltage detecting units 171 and 150, the current detecting units 172 and 182 and the temperature sensor 190. The fault judging circuit 191 may be attached to or included in the control portion 151.

In the DC—DC converter, input/output voltages (input/output currents) of the converter circuit portions 111 and 112 and the rectifier circuit portions 121 and 122 in the main circuit 110 are detected by the voltage detecting units 171 and 150 (current detecting units 172 and 182) respectively at the time of electric power conversion. Further, the operating temperatures thereof is detected by the temperature sensor 190. On the basis of the detection signals, when the input/output voltages (input/output currents) or the operating temperatures exceed predetermined allowable values set in advance, the fault judging circuit 191 judges the occurrence of fault voltage (fault current) such as overvoltage (overcurrent) or occurrence of fault temperature in the inverter operations and outputs gate blocking signals to the converter circuit portions 111 and 112 to turn off the switching elements to thereby stop the inverter operations of the converter circuit portions 111 and 112. Incidentally, while the converter circuit portions 111 and 112 are stopped on the basis of the gate blocking signals, an input side breaker CB may be opened if necessary.

Although the embodiments have shown the case where two sets of converter circuit portions 111 and 112 are connected in parallel to each other, the invention is not limited thereto and may be applied also to the configuration in which two sets of converter circuit portions 111 and 112 are series-connected to the DC power source Ed. Further, in the two sets of converter circuit portions 111 and 112, the switching elements $Q_3$, $Q_4$, $Q_7$ and $Q_8$ serve as commutation triggers for determining the commutation timing. Accordingly, the other switching elements $Q_1$, $Q_2$, $Q_5$ and $Q_6$ may be replaced by capacitors to form half bridge configuration.

Figure 17:
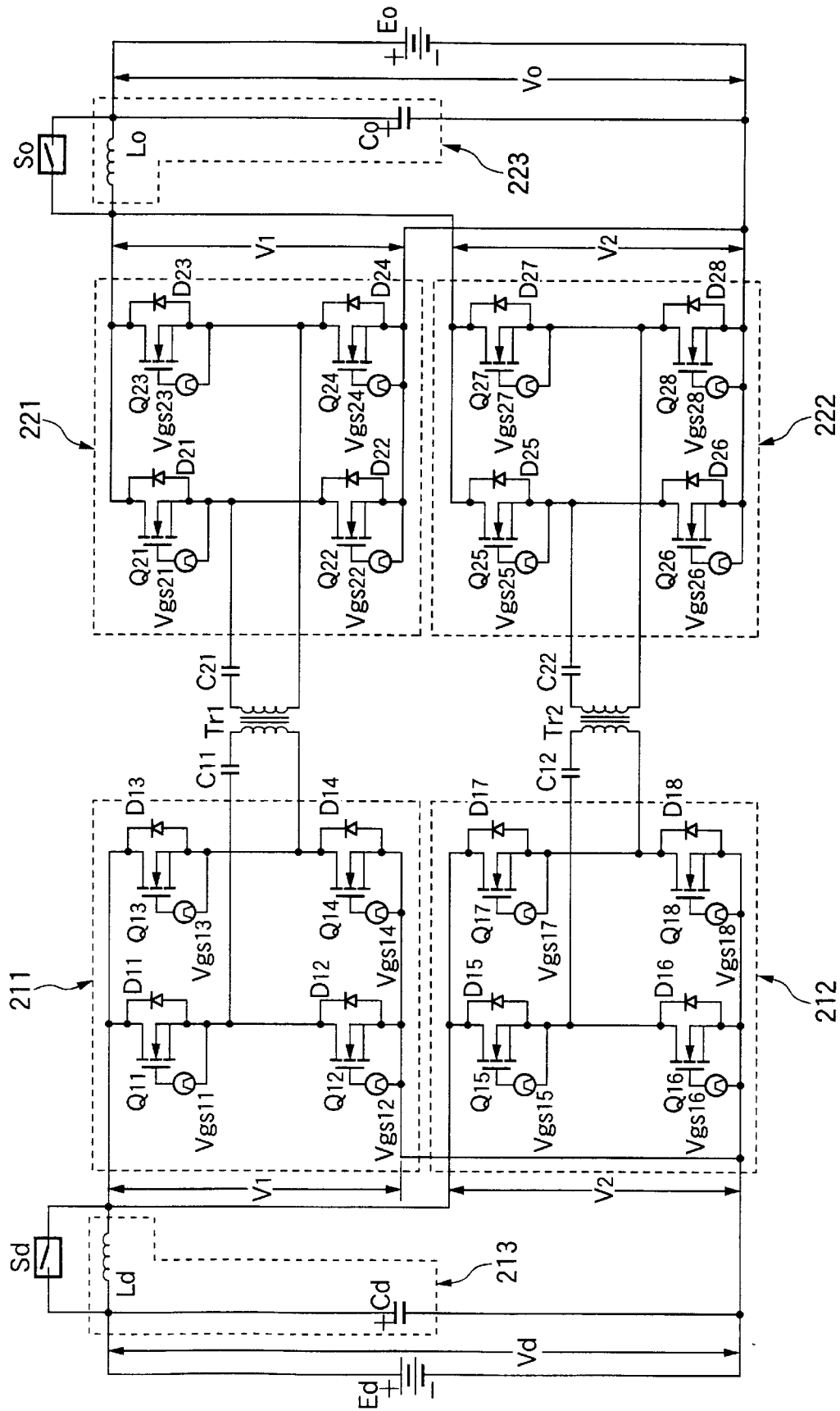
FIG. 17 is a circuit diagram of a bi-directional DC—DC converter according to a seventh embodiment of the invention.

FIG. 17 is a circuit diagram of a bi-directional DC—DC converter according to a seventh embodiment of the invention. In this embodiment, the DC—DC converter has first converter circuit portions 211 and 212 and second converter circuit portions 221 and 222, all converter circuit portions being equivalent in circuit configuration to one another. That is, the first converter circuit portions 211 and 212 respectively include two pairs of switching elements $Q_{11}$, $Q_{14}$ and $Q_{12}$, $Q_{13}$, and two pairs of switching elements $Q_{15}$, $Q_{18}$ and $Q_{16}$, $Q_{17}$ (such as MOS-FETs, bipolar transistors or IGBTs) connected in full bridge configuration. The second converter circuit portions 221 and 222 respectively include two pairs of switching elements $Q_{21}$, $Q_{24}$ and $Q_{22}$, $Q_{23}$, and two pairs of switching elements $Q_{25}$, $Q_{28}$ and $Q_{26}$, $Q_{27}$ (such as MOS-FETs, bipolar transistors or IGBTs) connected in full bridge configuration.

All the switching elements $Q_{11}$ to $Q_{18}$ and $Q_{21}$ to $Q_{28}$ in the first and second converter circuit portions 211, 212, 221 and 222 contain anti-parallel FWDs (Free Wheeling Diodes: hereinafter referred to as anti-parallel diodes $D_{11}$ to $D_{18}$ and $D_{21}$ to $D_{28}$) respectively. For example, the anti-parallel diodes $D_{11}$ to $D_{18}$ and $D_{21}$ to $D_{28}$ are structurally equivalent elements which exist in anti-parallel to MOS-FETs.

In the DC—DC converter, n sets, for example, two sets of first converter circuit portions 211 and 212 are parallel-connected to a DC power source which includes a secondary battery Ed such as a lead storage battery both dischargeable and chargeable. A first LC smoothing circuit portion 213 and a first switch Sd are inserted and connected between the first converter circuit portions 211 and 212 and the secondary battery Ed. To the first converter circuit portions 211 and 212, n sets, for example, two sets of second converter circuit portions 221 and 222 are parallel-connected through two transformers $Tr_1$ and $Tr_2$ respectively. Similarly to the first converter circuit portions 211 and 212, a second LC smoothing circuit portion 223 and a second switch So are connected to the second converter circuit portions 221 and 222.

Further, first series capacitors $C_{11}$ and $C_{12}$ are inserted and connected between the first converter circuit portions 211, 212 and the transformers $Tr_1$, $Tr_2$ respectively. Similarly, second series capacitors $C_{21}$ and $C_{22}$ are inserted and connected between the second converter circuit portions 221, 222 and the transformers $Tr_1$, $Tr_2$ respectively. Incidentally, FIG. 17 shows the configuration that a DC power source Eo is connected between terminals of the second converter circuit portions 221 and 222. In practice, the DC power source Eo may be an equivalent circuit having a DC voltage Vo appearing between the terminals of the second converter circuit portions 221 and 222 or may be a secondary battery (such as a lead storage battery) both dischargeable and chargeable.

Electric discharge of the secondary battery Ed due to electric power conversion from the first converter circuit portions 211 and 212 to the second converter circuit portions 221 and 222 in the DC—DC converter will be described first. On this occasion, the first switch Sd is turned on and the second switch So is turned off so that gate signals $Vgs_{11}$ to $Vgs_{14}$ and $Vgs_{15}$ to $Vgs_{18}$ are given to the switching elements $Q_{11}$ to $Q_{14}$ and $Q_{15}$ to $Q_{18}$ with the first converter circuit portions 211 and 212 as an input side to thereby perform inverter operations and so that gate signals $Vgs_{21}$ to $Vgs_{24}$ and $Vgs_{25}$ to $Vgs_{28}$ are not given to the switching elements $Q_{21}$ to $Q_{24}$ and $Q_{25}$ to $Q_{28}$ with the second converter circuit portions 221 and 222 as an output side to thereby perform rectifying operations through the anti-parallel diodes $D_{21}$ to $D_{24}$ and $D_{25}$ to $D_{28}$.

Figure 18:
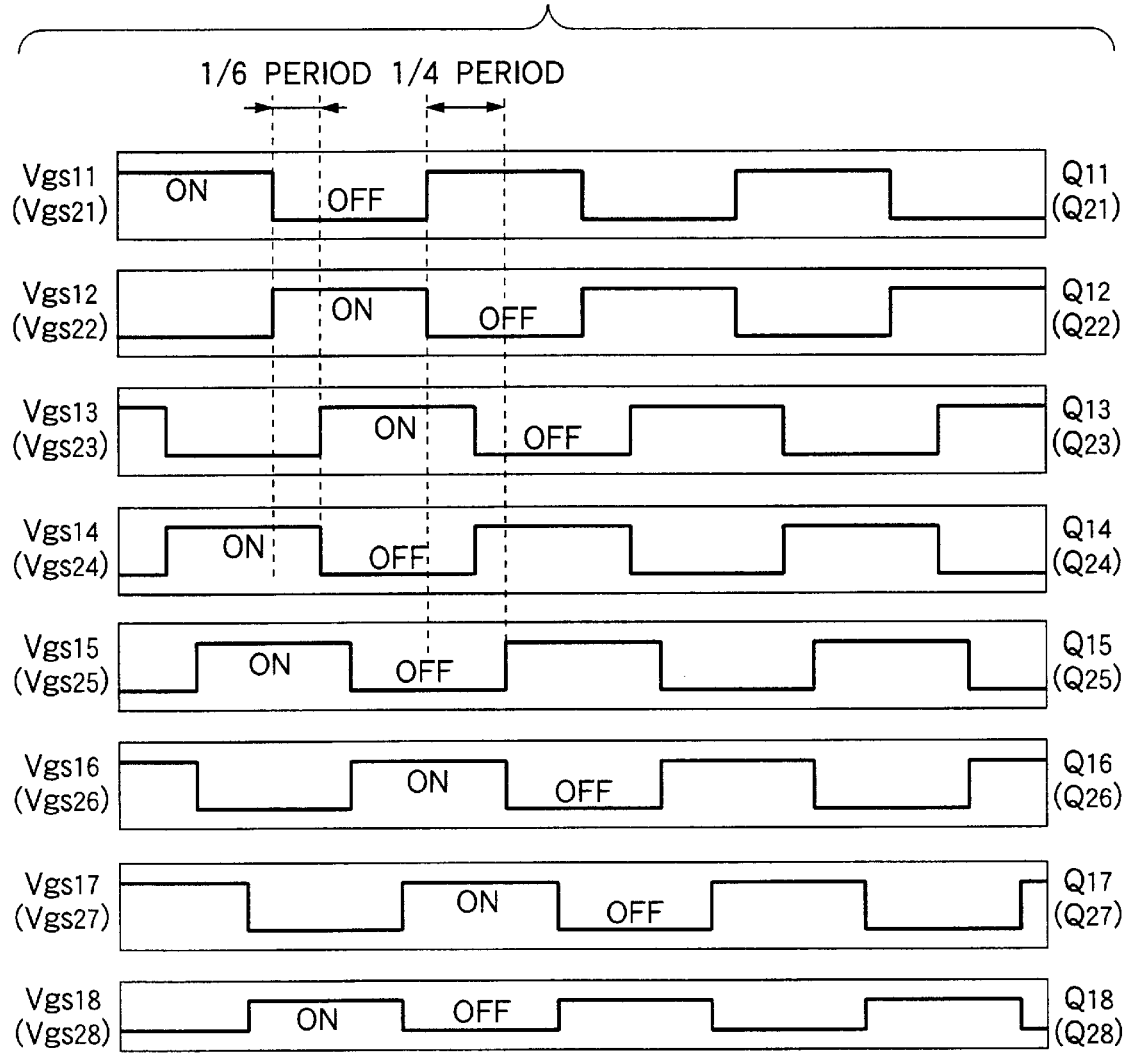
FIG. 18 is a timing chart of gate signals for turning on/off respective switching elements in the DC—DC converter depicted in FIG. 17.

FIG. 18 shows a timing chart of the gate signals $Vgs_{11}$ to $Vgs_{14}$ and $Vgs_{15}$ to $Vgs_{18}$ for turning on/off the switching elements $Q_{11}$ to $Q_{14}$ and $Q_{15}$ to $Q_{18}$ respectively in the DC—DC converter. As shown in FIG. 18, the switching elements $Q_{11}$, $Q_{14}$ and $Q_{12}$, $Q_{13}$ in the first converter circuit portion 211 and the switching elements $Q_{15}$, $Q_{18}$ and $Q_{16}$, $Q_{17}$ in the first converter circuit portion 212 are turned on/off alternately to obtain AC waveform outputs respectively. The AC waveform outputs of the first converter circuit portions 211 and 212 are rectified by the anti-parallel diodes $D_{21}$ to $D_{24}$ and $D_{25}$ to $D_{28}$ in the second converter circuit portions 221 and 222 through the transformers $Tr_1$ and $Tr_2$ and smoothed by the second LC smoothing circuit portion 223 to thereby generate a desired DC voltage Vo due to electric discharge of the secondary battery Ed.

In the two sets of first converter circuit portions 211 and 212, as shown in the timing chart of FIG. 18, the switching phase of one switching element $Q_{14}$ (or switching element $Q_{13}$ being an inversion of the switching element $Q_{14}$) in the pair of switching elements Q11 and $Q_{14}$ of one converter circuit portion 11 is delayed by a 1/3n period (a 1/6 period in the embodiment) relative to that of the other switching element $Q_{11}$ (or switching element $Q_{12}$ being an inversion of the switching element $Q_{11}$) Further, with respect to corresponding switching elements $Q_{11}$ and $Q_{15}$ in the converter circuit portions 211 and 212, the switching phase of the switching element $Q_{15}$ (or switching element $Q_{16}$ being an inversion of the switching element $Q_{15}$) in the other converter portion 212 is delayed by a 1/2n period (a 1/4 period in the embodiment) relative to that of the switching element $Q_{11}$. Further, the switching phase of one switching element $Q_{18}$ (or switching element $Q_{17}$ being an inversion of the switching element $Q_{18}$) in the pair of switching elements $Q_{15}$ and $Q_{18}$ of the other converter circuit portion 212 is delayed by a 1/6 period relative to that of the other switching element $Q_{15}$ (or switching element $Q_{16}$ being an inversion of the switching element $Q_{15}$).

Figure 19:
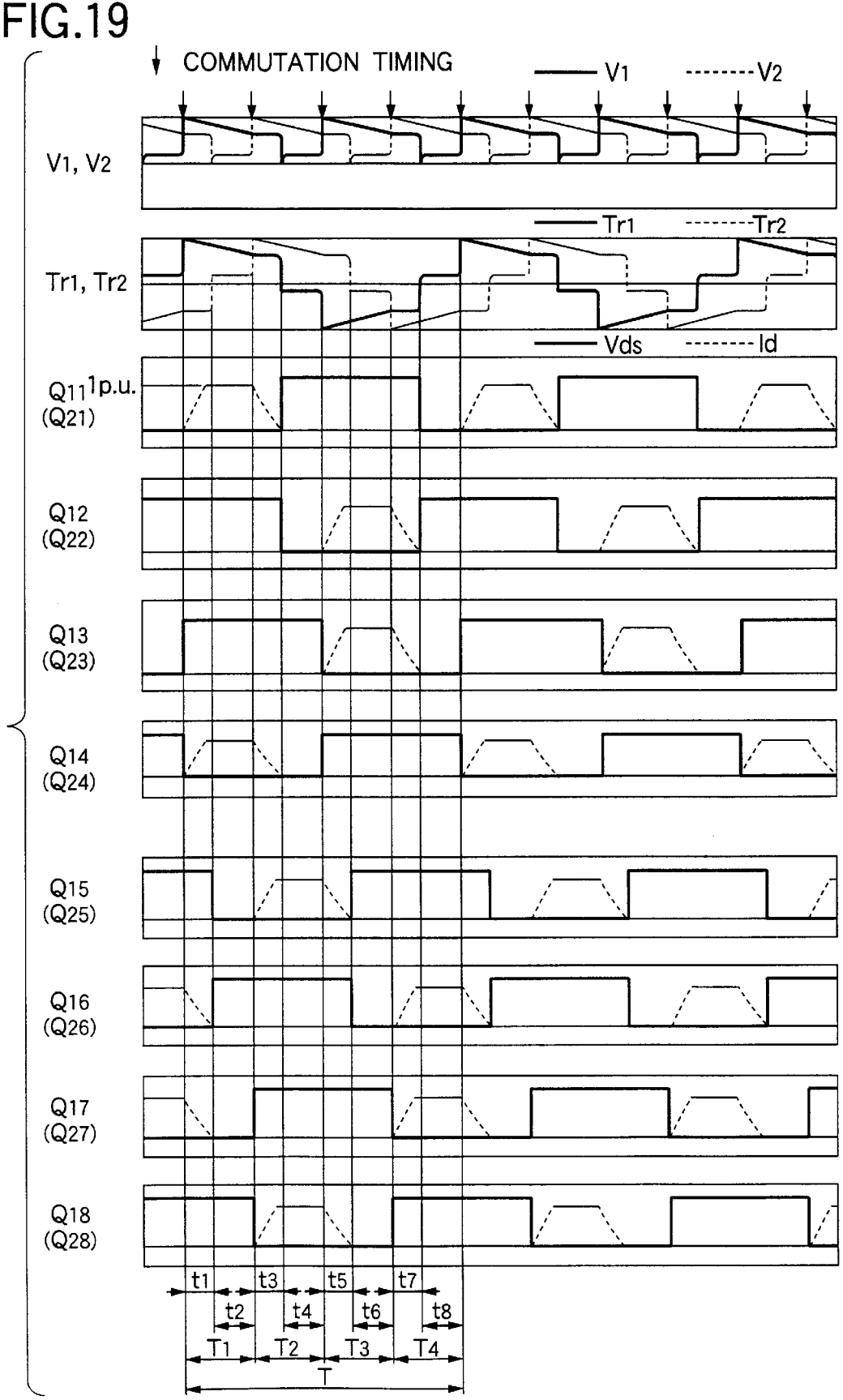
FIG. 19 is a waveform chart of the output voltages of the first or second converter circuit portions, the primary voltages of the transformers and the drain-source voltages and drain currents of the switching elements in the rectifying operation in FIG. 17.

FIG. 19 is a waveform chart of the respective output voltages $V_1$ and $V_2$ of the second converter circuit portions 221 and 222, the primary voltages of the transformers $Tr_1$ and $Tr_2$ and the respective drain-source voltages Vds and drain currents Id of the switching elements $Q_{11}$ to $Q_{14}$ and $Q_{15}$ to $Q_{18}$. The switching elements $Q_{11}$ to $Q_{14}$ and $Q_{15}$ to $Q_{18}$ in the first converter circuit portions 211 and 212 perform switching operations (see the table of FIG. 20) with drain-source voltages Vds and drain currents Id as shown in FIG. 19. FIG. 20 is a table showing the change and transition of respective current values in the switching elements $Q_{11}$ to $Q_{14}$ and $Q_{15}$ to $Q_{18}$. To supply constant electric power to a load, that is, to supply a constant current to the load under a constant voltage output, the total output current from the switching elements $Q_{11}$ to $Q_{14}$ and $Q_{15}$ to $Q_{18}$ comes to a current value of 1 p.u. at any timing. That is, when the output current from the switching elements $Q_{11}$ to $Q_{14}$ in one converter circuit portion 211 changes from 0 to 1 p.u. at a certain timing, the output current from the switching elements $Q_{15}$ to $Q_{18}$ in the other converter circuit portion 212 changes from 1 to 0 p.u. Further, when the output current from the switching elements $Q_{11}$ to $Q_{14}$ in one converter circuit portion 211 is 1 p.u. at another timing, the output current from the switching elements $Q_{15}$ to $Q_{18}$ in the other converter circuit portion 212 is 0 p.u.

Incidentally, time segments $t_1$ to $t_8$ can be changed freely if those time segments satisfy the conditions $0<t_1 \leq 1/4 \cdot T$, $0 \leq t_2 < 1/4 \cdot T$, $0<t_3 \leq 1/4 \cdot T$, $0 \leq t_4 < 1/4 \cdot T$, $0<t_5 \leq 1/4 \cdot T$, $0 \leq t_6 < 1/4 \cdot T$, $0<t_7 \leq 1/4 \cdot T$ and $0 \leq t_8 < 1/4 \cdot T$ respectively. Although the eight conditions are OR conditions, the time segments $t_1$ to $t_8$ need to satisfy the relation $t_1+t_2+t_3+t_4+t_5+t_6+t_7+t_8=T$. In practice each of the time segments $t_1$, $t_3$, $t_5$ and $t_7$ in which the current changes is limited within a range without generating any switching loss because the waveform varies in accordance with the circuit constant.

By the switching operations of the switching elements $Q_{11}$ to $Q_{14}$ and $Q_{15}$ to $Q_{18}$, the absolute values of values obtained by multiplying the primary voltages (the second stage from the uppermost stage in FIG. 19) of the transformers $Tr_1$ and $Tr_2$ by transformation ratios of the transformers $Tr_1$ and $Tr_2$ respectively, that is, values (the uppermost stage in FIG. 19) obtained by folding back the waveforms of the primary voltages at a zero point, are generated as output voltages $V_1$ and $V_2$ which are obtained by rectification of the secondary voltages of the transformers $Tr_1$ and $Tr_2$ by the anti-parallel diodes $D_{21}$ to $D_{24}$ and $D_{25}$ to $D_{28}$ of the second converter circuit portions 221 and 222. The output voltages $V_1$ and $V_2$ of the second converter circuit portions 221 and 222 are traced at the highest voltage value by commutation to thereby generate a DC voltage Vo. This commutation is repeated in the order of switching elements $Q_{11}$, $Q_{14}$→switching elements $Q_{15}$, $Q_{18}$→switching elements $Q_{12}$, $Q_{13}$→switching elements $Q_{16}$, $Q_{17}$→switching elements $Q_{11}$, $Q_{14}$ in the timing represented by the arrows in FIG. 19.

These switching elements $Q_{11}$ to $Q_{14}$ and $Q_{15}$ to $Q_{18}$ are turned on/off in the timing in which switching phases are shifted. Hence, there is no switching loss produced in the output voltages $V_1$ and $V_2$ of the second converter circuit portions 221 and 222 because the state in which drain-source voltages Vds are applied while drain currents Id flow in the switching elements $Q_{11}$ to $Q_{14}$ and $Q_{15}$ to $Q_{18}$ is eliminated by the commutation. Further, the commutation timing is determined by the switching elements $Q_{13}$, $Q_{14}$, $Q_{17}$ and $Q_{18}$ which serve as triggers for the commutation. Even in the case where gate signals are given to the switching elements $Q_{13}$, $Q_{14}$, $Q_{17}$ and $Q_{18}$ so that the switching elements $Q_{13}$, $Q_{14}$, $Q_{17}$ and $Q_{18}$ are turned on, there is no turn-on switching loss produced because the leading edges of the drain currents Id are prevented by leakage reactance of the transformers $Tr_1$ and $Tr_2$ so that the drain currents Id do not reach peak currents immediately after the commutation.

Further, series capacitors $C_{11}$ and $C_{12}$ are inserted and connected between the first converter circuit portions 211 and 212 and the transformers $Tr_1$, $Tr_2$ respectively. Hence, the flat portions of the output voltages of the first converter circuit portions 211 and 212 are drooped (inclined) by differentiating circuits including the series capacitors $C_{11}$ and $C_{12}$ and leakage reactance of the transformers $Tr_1$ and $Tr_2$ to thereby generate voltage waveforms having high leading edges respectively. Hence, the difference between voltages before and after the commutation timing is made so large that the commutating operation can be performed steadily. Moreover, DC components contained by variations in ON-resistance and switching speed in accordance with the individual differences of the switching elements $Q_{11}$ to $Q_{14}$ and $Q_{15}$ to $Q_{18}$ may be cut so that DC eccentric excitation of the transformers $Tr_1$ and $Tr_2$ can be prevented.

In the DC—DC converter, the first converter circuit portions 211 and 212 have the same circuit configuration as that of the second converter circuit portions 221 and 222 because the first converter circuit portions 211 and 212 include switching elements $Q_{11}$ to $Q_{18}$ provided with anti-parallel diodes $D_{11}$ to $D_{18}$ respectively and the second converter circuit portions 221 and 222 include switching elements $Q_{21}$ to $Q_{28}$ provided with anti-parallel diodes $D_{21}$ to $D_{28}$ respectively. Hence, the secondary battery Ed can be electrically charged on the basis of electric power conversion from the second converter circuit portions 221 and 222 to the first converter circuit portions 211 and 212. On this occasion, when the second switch So is turned on and the first switch Sd is turned off, gate signals $Vgs_{21}$ to $Vgs_{24}$ and $Vgs_{25}$ to $Vgs_{28}$ are given to the switching elements $Q_{21}$ to $Q_{24}$ and $Q_{25}$ to $Q_{28}$ with the second converter circuit portions 221 and 222 as an input side to thereby perform inverter operations and gate signals $Vgs_{11}$ to $Vgs_{14}$ and $Vgs_{15}$ to $Vgs_{18}$ are not given to the switching elements $Q_{11}$ to $Q_{14}$ and $Q_{15}$ to $Q_{18}$ with the first converter circuit portions 211 and 212 as an output side to thereby perform rectifying operations through the anti-parallel diodes $D_{11}$ to $D_{14}$ and $D_{15}$ to $D_{18}$.

That is, as shown in the timing chart of FIG. 18, the switching elements $Q_{21}$, $Q_{24}$ and $Q_{22}$, $Q_{23}$ in the second converter circuit portion 221 and the switching elements $Q_{25}$, $Q_{28}$ and $Q_{26}$, $Q_{27}$ in the second converter circuit portion 222 are turned on/off alternately to thereby obtain AC waveform outputs. The AC waveform outputs of the second converter circuit portions 221 and 222 are rectified by the anti-parallel diodes $D_{11}$ to $D_{14}$ and $D_{15}$ to $D_{18}$ of the first converter circuit portions 211 and 212 through the transformers $Tr_1$ and $Tr_2$ respectively and smoothed by the first LC smoothing circuit portion 213 to thereby generate a desired DC voltage Vd on the basis of the DC power source Vo equivalent to the DC power source Eo. The secondary battery Ed is electrically charged with the DC voltage Vd.

In the two sets of second converter circuit portions 221 and 222, like the first converter circuit portions 211 and 212 described above in electric power conversion from the first converter circuit portions 211 and 212 to the second converter circuit portions 221 and 222, the switching elements $Q_{21}$ to $Q_{24}$ and $Q_{25}$ to $Q_{28}$ are turned on/off in the timing in which the switching phases are shifted as shown in the timing chart of FIG. 18. The correlation among the switching elements $Q_{21}$ to $Q_{24}$ and $Q_{25}$ to $Q_{28}$ is the same as that among the switching elements $Q_{11}$ to $Q_{14}$ and $Q_{15}$ to $Q_{18}$ at the time of electric power conversion from the first converter circuit portions 211 and 212 to the second converter circuit portions 221 and 222. However, the switching frequency in the second converter circuit portions 221 and 222 need not be equal to that in the first converter circuit portions 211 and 212 because the switching operation in the second converter circuit portions 221 and 222 is not performed simultaneously with the switching operation in the first converter circuit portions 211 and 212.

The switching elements $Q_{21}$ to $Q_{24}$ and $Q_{25}$ to $Q_{28}$ in the second converter circuit portions 221 and 222 perform switching operations (see the table of FIG. 20) with drain-source voltages Vds and drain currents Id as shown in FIG. 9, similarly to the first converter circuit portions 211 and 212 at the time of electric power conversion from the first converter circuit portions 211 and 212 to the second converter circuit portions 221 and 222. Hence, the output voltages $V_1$ and $V_2$ obtained by a result of rectification through the anti-parallel diodes $D_{11}$ to $D_{14}$ and $D_{15}$ to $D_{18}$ in the first converter circuit portions 121 and 122 are traced at the highest voltage value by commutation to thereby generate a DC voltage Vd.

Accordingly, there is no switching loss produced in the output voltages $V_1$ and $V_2$ of the second converter circuit portions 221 and 222 because the state in which drain-source voltages Vds are applied while drain currents Id flow in the switching elements $Q_{21}$ to $Q_{24}$ and $Q_{25}$ to $Q_{28}$ is eliminated by the commutation. Further, the commutation timing is determined by the switching elements $Q_{23}$, $Q_{24}$, $Q_{27}$ and $Q_{28}$ which serve as triggers for the commutation. Even in the case where gate signals are given to the switching elements $Q_{23}$, $Q_{24}$, $Q_{27}$ and $Q_{28}$ so that the switching elements $Q_{23}$, $Q_{24}$, $Q_{27}$ and $Q_{28}$ are turned on, there is no turn-on switching loss produced, because the leading edges of the drain currents Id are prevented by leakage reactance of the transformers $Tr_1$ and $Tr_2$ so that the drain currents Id do not reach peak currents immediately after the commutation.

Further, series capacitors $C_{21}$ and $C_{22}$ are inserted and connected between the second converter circuit portions 221, 222 and the transformers $Tr_1$, $Tr_2$ respectively. Hence, the flat portions of the output voltages of the second converter circuit portions 221 and 222 are drooped (inclined) to generate voltage waveforms having high leading edge portions respectively. Hence, the difference between voltages before and after the commutation timing is made so large that the commutating operation can be performed steadily. Moreover, DC components which have contained due to variations in ON-resistance and switching speed in accordance with the individual differences of the switching elements $Q_{21}$ to $Q_{24}$ and the switching elements $Q_{25}$ to $Q_{28}$ may be cut so that DC eccentric excitation of the transformers $Tr_1$ and $Tr_2$ can be prevented.

Figure 21:
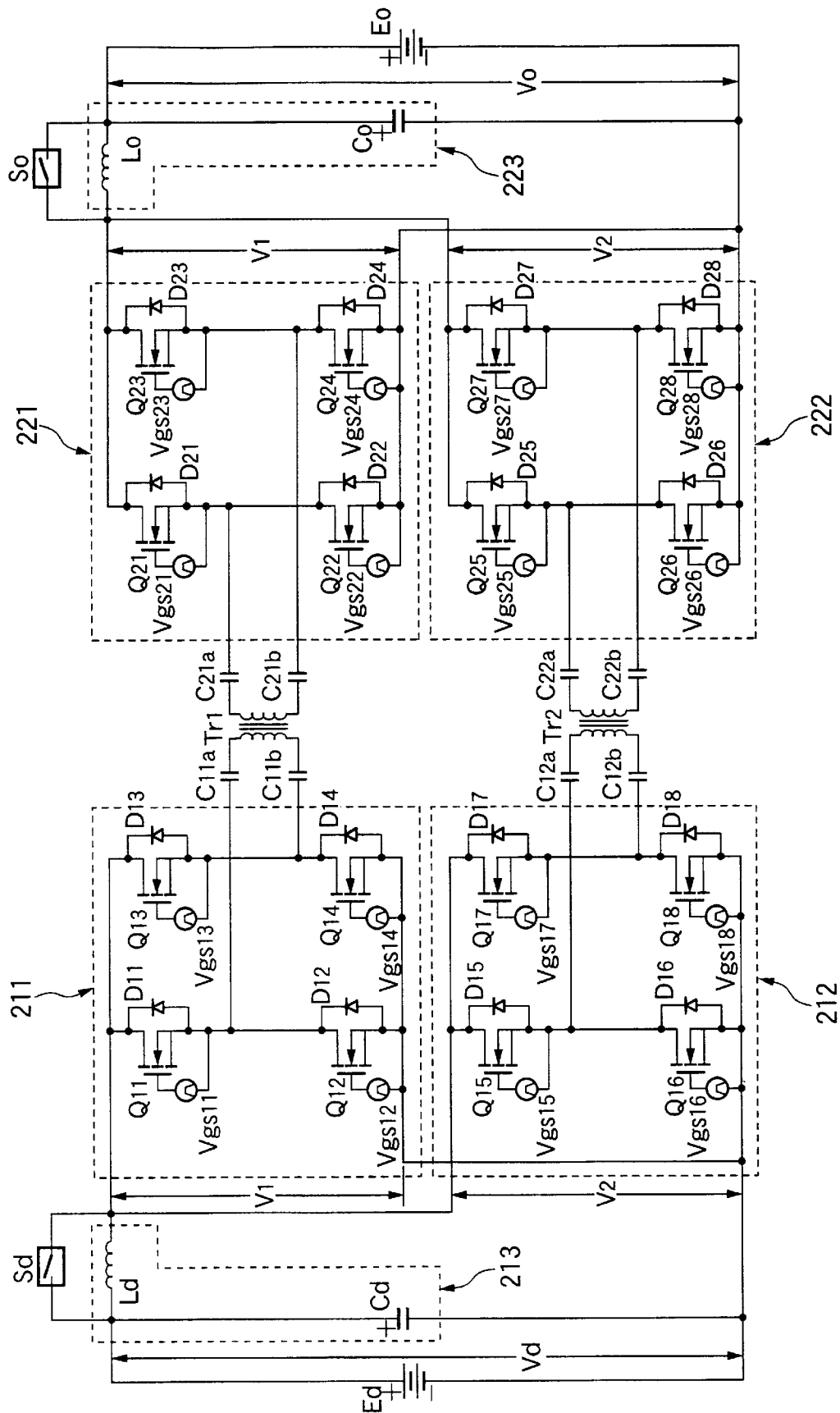
FIG. 21 is a circuit diagram showing a bi-directional DC—DC converter according to an eighth embodiment of the invention.

Incidentally, in the embodiment shown in FIG. 17, the series capacitors $C_{11}$ and $C_{12}$ inserted and connected between the first converter circuit portions 211 and 212 and the transformers $Tr_1$ and $Tr_2$ respectively and the series capacitors $C_{21}$ and $C_{22}$ inserted and connected between the second converter circuit portions 221, 222 and the transformers $Tr_1$ and $Tr_2$ respectively may be divided into two. That is, as represented by a eighth embodiment shown in FIG. 21, series capacitors $C_{11a}$, $C_{11b}$ and $C_{12a}$, $C_{12b}$ may be inserted and connected between the first converter circuit portions 211 and 212 and the transformers $Tr_1$ and $Tr_2$ respectively and series capacitors $C_{21a}$, $C_{21b}$ and $C_{22a}$, $C_{22b}$ may be inserted and connected between the second converter circuit portions 221, 222 and the transformers $Tr_1$ and $Tr_2$ respectively.

Figure 22:
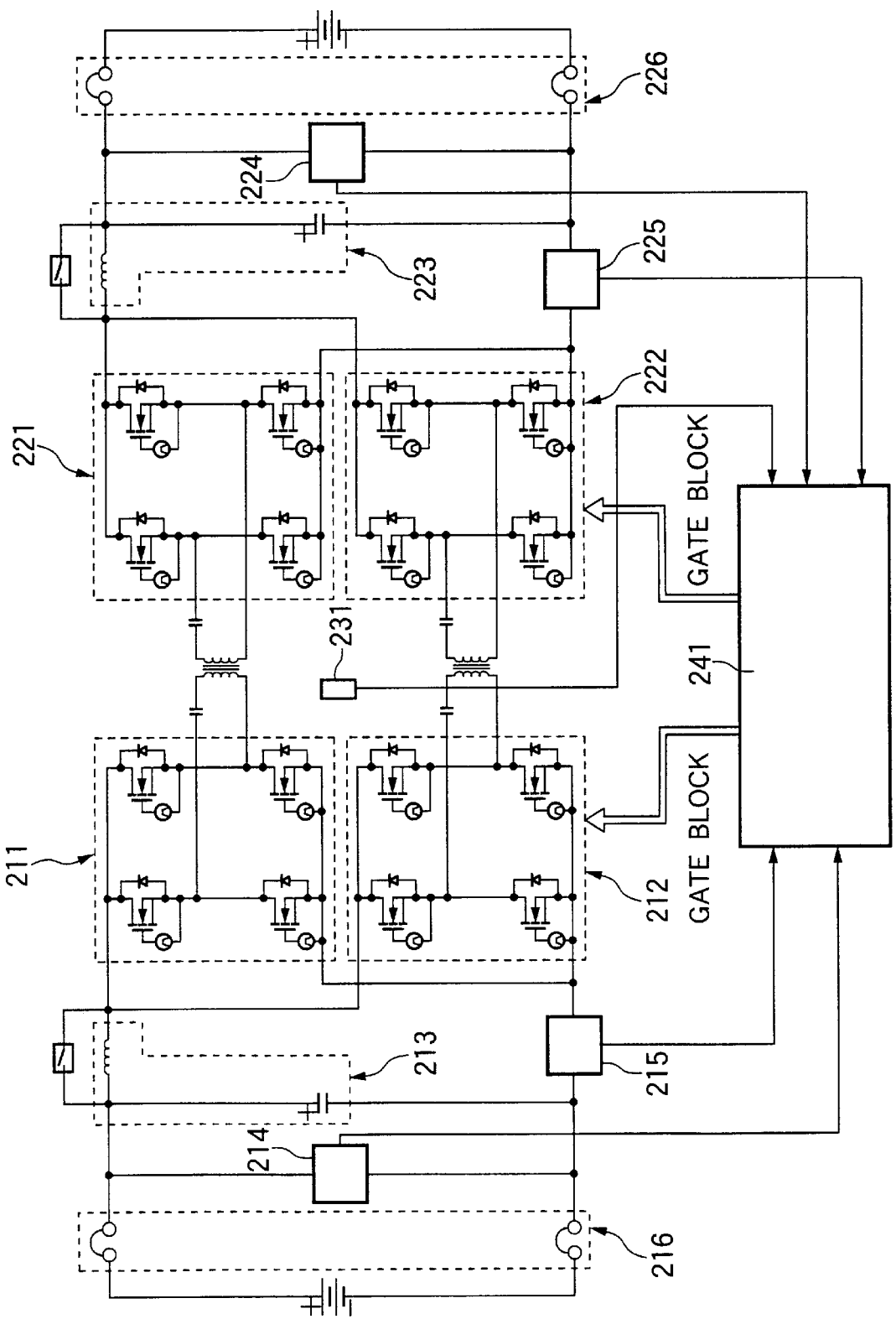
FIG. 22 is a circuit diagram showing a bi-directional DC—DC converter according to a ninth embodiment of the invention in which a protecting function is added to the DC—DC converter depicted in FIG. 17.

FIG. 22 shows the DC—DC converter according to the ninth embodiment of the invention in which a protecting function is added to the embodiment shown in FIG. 17. Incidentally, it is a matter of course that the protecting function can be applied also to the embodiment shown in FIG. 18. In the DC—DC converter shown in FIG. 22, a voltage detecting portion 214 and a current detecting portion 215 which form fault detecting units are provided on the DC power source Ed side of the first converter circuit portions 211 and 212. Further, a voltage detecting portion 224 and a current detecting portion 225 are provided on the DC power source Eo side of the second converter circuit portions 221 and 222. Moreover, a temperature sensor 231 is disposed as an fault detecting unit for detecting overheating of the first converter circuit portions 211 and 212 and the second converter circuit portions 221 and 222. An fault judging circuit 241 is provided so that gate blocking signals for blocking the gate signals $Vgs_{11}$ to $Vgs_{18}$ and $Vgs_{21}$ to $Vgs_{28}$ for driving the switching elements $Q_{11}$ to $Q_{18}$ and $Q_{21}$ to $Q_{28}$ are output from the fault judging circuit 241 on the basis of the signals detected by the voltage detecting portions 214 and 224 the current detecting portions 215 and 225 and the temperature sensor. 231.

In the DC—DC converter, input/output voltages (input/output currents) of the first converter circuit portions 211 and 212 and the second converter circuit portions 221 and 222 are detected by the voltage detecting portions 214 and 224 (current detecting portions 215 and 225) respectively at the time of electric power conversion from the first converter circuit portions 211 and 212 to the second converter circuit portions 221 and 222 or at the time of electric power conversion from the second converter circuit portions 221 and 222 to the first converter circuit portions 211 and 212. On the basis of the detection signals, when the input/output voltages (input/output currents) exceed predetermined allowable values set in advance, the fault judging circuit 241 outputs gate blocking signals to the first converter circuit portions 211 and 212 or the second converter circuit portions 221 and 222 where fault voltage (fault current) such as overvoltage (overcurrent) is produced in the inverter operation. In this manner, corresponding switching elements are turned off to thereby stop the inverter operation of the first converter circuit portions 211 and 212 or the second converter circuit portions 221 and 222. Incidentally, while the first converter circuit portions 211 and 212 or the second converter circuit portions 221 and 222 are stopped on the basis of the gate blocking signals, an input side breaker 216 or an output side breaker 226 may be opened if necessary.

Further, the temperature of the switching elements $Q_{11}$ to $Q_{18}$ and $Q_{21}$ to $Q_{28}$ provided with the anti-parallel diodes $D_{11}$ to $D_{18}$ and $D_{21}$ to $D_{28}$ and constituting the first converter circuit portions 211 and 212 and the second converter circuit portions 221 and 222 respectively is detected by the temperature sensor 231. On the basis of the detection signal, when the temperature exceeds a predetermined allowable value set in advance, the fault judging circuit 241 outputs gate blocking signals to the first converter circuit portions 211 and 212 or the second converter circuit portions 221 and 222 where fault temperature such as overtemperature is produced in the inverter operation. In this manner, corresponding switching elements are turned off to thereby stop the inverter operation of the first converter circuit portions 211 and 212 or the second converter circuit portions 221 and 222. Incidentally, while the first converter circuit portions 211 and 212 or the second converter circuit portions 221 and 222 are stopped on the basis of the gate blocking signals, the input side breaker 216 or the output side breaker 226 may be opened if necessary.

In the bi-directional DC—DC converter, a voltage detecting unit and a voltage compensating portion as shown in FIG. 7 may be provided for adjusting the output voltage of the rectifier circuit portions.

According to the invention, in the n sets of converter circuit portions, the switching phase of one switching element in each pair of switching elements included in each of the converter circuit portions is shifted by a 1/3n period from the switching phase of the other switching element in the pair of switching elements. Further, the switching phases of corresponding switching elements in the converter circuit portions are shifted by a 1/2n period from one another. Hence, switching loss is never produced because the state in which a switching voltage is applied while a switching current flows in each switching element is eliminated by commutation.

Further, when the n sets of converter circuit portions are connected in series to the DC power source in the case where each of the switching elements includes an MOS-FET, the voltage applied to each MOS-FET in each converter circuit portion can be reduced to 1/n as much as the power source voltage of the DC power source. Hence, the withstand voltage of the MOS-FET used as a switching element can be reduced to 1/n, so that conduction loss, due to ON-resistance, increasing in proportion to the $2.5^{th}$ power of the withstand voltage can be prevented.

Accordingly, there can be provided a high-efficiency DC—DC converter in which reduction in switching loss is attained and in which low ON-resistance and low with stand voltage MOS-FETs can be used as switching elements.

Further, according to the invention, a voltage detecting unit is provided-on the output side of the rectifier circuit portions and a voltage compensating portion is additionally provided so that the output voltage is adjusted by a correcting instruction output from the control portion on the basis of the signal detected by the voltage detecting unit. Hence, the fluctuation of the output voltage of the rectifier circuit portions can be compensated by the voltage compensating portion even in the case where the output voltage fluctuates. Hence, the output voltage can be adjusted to a desired value, so that stabilization of the output voltage can be attained.

Accordingly, there can be provided a high-efficiency DC—DC converter in which reduction in switching loss can be attained and in which a stable output voltage can be obtained.

Further, according to the invention, the first and second converter circuit portions each including anti-parallel diode-provided switching elements connected in full bridge configuration are connected to one another through transformers respectively. The first converter circuit portions have the same circuit configuration as that of the second converter circuit portions so that each of the converter circuit portions includes anti-parallel diode-provided switching elements. Hence, inverter operations are performed in the first converter circuit portions or the second converter circuit portions located on an input side, while rectifying operations are performed by anti-parallel diodes in the other converter circuit portions located on an output side. As a result, both electric power conversion from the first converter circuit portions to the second converter circuit portions and electric power conversion from the second converter circuit portions to the first converter circuit portions can be performed. Hence, bi-directional electric power conversion can be achieved.

Accordingly, there can be provided a high-efficiency DC—DC converter in which reduction in switching loss is attained and in which electric power conversion from the secondary side to the primary side can be performed as well as electric power conversion from the primary side to the secondary side.

Further, fault detecting units are provided in the first and second converter circuit portions respectively, and an fault judging circuit is provided so that gate blocking signals for turning off the switching elements respectively are selectively output to the first and second converter circuit portions on the basis of a signal detected by any one of the respective fault detecting units. Hence, the self-protecting function of the device can be fulfilled and the safety and reliability of the device can be improved.

What is claimed is:

1. A DC—DC converter comprising:
  n sets of converter circuit portions for converting a power source voltage of a DC power supply into AC voltages, each of which includes two pairs of switching elements connected in full bridge configuration;
  transformers connected to output sides of the converter circuit portions; and
  rectifier circuit portions connected to said converter circuit portions through the transformers respectively,
  wherein a switching phase of one switching element in each pair of switching elements included in each converter circuit portion is shifted by a 1/3n period from a switching phase of the other switching element in said pair of switching elements, and switching phases of corresponding switching elements in said converter circuit portions are shifted by a 1/2n period from one another.

2. The DC—DC converter according to claim 1, further comprising:
series capacitors inserted and connected between said converter circuit portions and said transformers respectively.

3. The DC—DC converter according to claim 1, wherein said n sets of converter circuit portions are connected in series to said DC power source.

4. The DC—DC converter according to claim 3, wherein each of said switching elements includes an MOS-FET.

5. The DC—DC converter according to claim 1, wherein one switching element in each pair of switching elements included in each converter circuit portion is replaced by a capacitor to thereby form said converter circuit portion into half bridge configuration.

6. The DC—DC converter according to claim 1, wherein said n sets of converter circuit portions are connected in parallel to said DC power source.

7. The DC—DC converter according to claim 1, further comprising:
a voltage detecting unit provided on an output side of said rectifier circuit portions for detecting output signals of said rectifier circuit portions; and
a voltage compensating portion for adjusting an output voltage of said DC—DC converter on the basis of the output signals detected by said voltage detecting unit.

8. The DC—DC converter according to claim 7, wherein said voltage compensating portion includes a voltage compensating converter circuit portion parallel-connected to said converter circuit portions and having two pairs of switching elements connected in full bridge configuration, a transformer connected to an output side of the voltage compensating converter circuit portion, and a voltage compensating rectifier circuit portion series-connected to said rectifier circuit portions and connected to said voltage compensating converter circuit portion through the transformer.

9. The DC—DC converter according to claim 7, wherein said voltage compensating portion includes tap changing circuits which are provided between said transformers and said rectifier circuit portions respectively for changing taps in secondary windings of said transformers respectively.

10. The DC—DC converter according to claim 7, further comprising:
fault detecting units provided in said converter circuit portions and in said rectifier circuit portions respectively for detecting signals to said converter circuit portions and signals from said rectifier circuit portions; and
an fault judging circuit for outputting gate blocking signals for turning off said switching elements to said converter circuit portions on the basis of signals detected by said fault detecting units.

11. A bi-directional DC—DC converter comprising:
n sets of first converter circuit portions connected in parallel to one another, each of which includes two pairs of anti-parallel diode-provided switching elements connected in full bridge configuration;
n sets of second converter circuit portions connected in parallel to one another, each of which includes two pairs of anti-parallel diode-provided switching elements connected in full-bridge configuration; and
transformers provided between said first and second converter circuit portions so that said first converter circuit portions are connected to said second converter circuit portions through the transformers respectively;
wherein in said n sets of first converter circuit portions or said n sets of second converter circuit portions located on an input side, inverter operations are performed in a timing in which a switching phase of one switching element in each pair of switching elements included in each of said n sets of converter circuit portions is shifted by a 1/3n period from a switching phase of the other switching element in said pair of switching elements and in which switching phases of corresponding switching elements in said n sets of converter circuit portions are shifted by a 1/2n period from one another, and in the other n sets of converter circuit portions located on an output side, rectifying operations are performed by the anti-parallel diodes.

12. The bi-directional DC—DC converter according to claim 11, further comprising:
series capacitors interposed between said first converter circuit portions and said transformers and between said second converter circuit portions and said transformers respectively.

13. The bi-directional DC—DC converter according to claim 11, further comprising:
fault detecting units provided in said first and second converter circuit portions respectively for detecting input/output signals of said first and second converter circuit portions; and
an fault judging circuit for selectively outputting gate blocking signals for turning off said switching elements respectively to said first and second converter circuit portions on the basis of the input/output signals detected by said fault detecting units.

14. A method of controlling a DC—DC converter having n sets of converter circuit portions, each of which includes two pairs of switching elements connected in full bridge configuration and rectifier circuit portions provided on output sides of said converter circuit portions through transformers respectively, said method comprising:
converting a power source voltage of a DC power supply into AC voltages by said converter circuit portions;
transforming the AC voltages by the transformers; and
rectifying secondary outputs of the transformers by said rectifier circuit portions,
wherein a switching phase of one switching element in each pair of switching elements included in each converter circuit portion is shifted by a 1/3n period from a switching phase of the other switching element in said pair of switching elements, and switching phases of corresponding switching elements in said converter circuit portions are shifted by a 1/2n period from one another.

15. The method of controlling a DC—DC converter according to claim 14, further comprising:
detecting output signals of said rectifier circuit portions; and
adjusting an output voltage of said DC—DC converter on the basis of the output signals detected from said rectifier circuit portions.

16. The method of controlling a DC—DC converter according to claim 14, wherein the output voltage of said DC—DC converter is adjusted by changing taps in secondary windings of said transformers respectively.

17. The method of controlling a DC—DC converter according to claim 14, further comprising:
detecting signals to said converter circuit portions and signals from said rectifier circuit portions respectively;
comparing the detected signals with predetermined values; and outputting gate blocking signals for turning off said switching elements to said converter circuit portions if the detected signals exceed the predetermined values.

18. A method of controlling a bi-directional DC—DC converter having n sets of first converter circuit portions connected in parallel to one another, each of which includes two pairs of anti-parallel diode-provided switching elements connected in full bridge configuration and n sets of second converter circuit portions connected in parallel to one another, each of which includes two pairs of anti-parallel diode-provided switching elements connected in full bridge configuration, said first converter circuit portions being connected to said second converter circuit portions through transformers respectively, said method comprising;

performing inverter operations in said n sets of first converter circuit portions or said n sets of second converter circuit portions located on an input side in a timing in which a switching phase of one switching element in each pair of switching elements included in each of said n sets of converter circuit portions is shifted by a 1/3n period from a switching phase of the other switching element in said pair of switching elements and in which switching phases of corresponding switching elements in said n sets of converter circuit portions are shifted by a 1/2n period from one another; and performing rectifying operations in the other n sets of converter circuit portions located on an output side by the anti-parallel diodes.

19. The method of controlling a bi-directional DC—DC converter according to claim 18, further comprising:

detecting input/output signals of said first and second converter circuit portions respectively;

comparing the detected input/output signals with predetermined values; and selectively outputting gate blocking signals for turning off said switching elements respectively to said first and second converter circuit portions if the detected input/output signals exceed the predetermined values.

* * * * *